US007749068B2

(12) United States Patent
Cuddy et al.

(10) Patent No.: US 7,749,068 B2
(45) **Date of Patent: *Jul. 6, 2010**

(54) GAMING DEVICE HAVING A DESTINATION PURSUIT BONUS SCHEME WITH ADVANCE AND SETBACK CONDITIONS

(75) Inventors: Ryan W. Cuddy, Reno, NV (US); Tonja M. Ferry, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1336 days.

This patent is subject to a terminal disclaimer.

(21) Appl. No.: 10/660,075

(22) Filed: Sep. 10, 2003

(65) Prior Publication Data

US 2004/0106444 A1 Jun. 3, 2004

Related U.S. Application Data

(63) Continuation-in-part of application No. 10/288,750, filed on Nov. 6, 2002, now Pat. No. 6,786,820, which is a continuation of application No. 09/686,409, filed on Oct. 11, 2000, now Pat. No. 6,494,785.

(51) Int. Cl.
*A63F 13/00* (2006.01)

(52) U.S. Cl. .............................. 463/20; 463/16; 463/42

(58) Field of Classification Search ................... 463/16, 463/20, 42; 273/243
See application file for complete search history.

(56) References Cited

U.S. PATENT DOCUMENTS 4,448,419 A 5/1984 Telnaes
4,477,081 A * 10/1984 Crosby ........................ 273/251

(Continued)

FOREIGN PATENT DOCUMENTS

EP 0874337 A1 10/1998

(Continued)

OTHER PUBLICATIONS

Hyper Viper Advertisement written by Barcrest, published in Apr. 1983.

(Continued)

*Primary Examiner*—Peter DungBa Vo
*Assistant Examiner*—William H McCulloch
(74) *Attorney, Agent, or Firm*—K&L Gates LLP

(57) ABSTRACT

A gaming device having a plurality of locations including a destination location, a player symbol and an award associated with a plurality of the locations. The gaming device includes a setback condition associated with one of the locations, wherein when the player symbol moves to the location having the associated setback condition, the player symbol is relocated based on the setback condition to one of the locations further from the destination location and an advance condition associated with one of the locations, wherein when the player symbol moves to the location having the advance condition, the player symbol is relocated based on the advance condition to one of the locations toward to the destination location. The player symbol is moved to at least one and preferably a plurality of the locations and the player is provided any awards associated with the locations of the player symbol until the player symbol is moved to or beyond the destination location.

66 Claims, 14 Drawing Sheets

U.S. PATENT DOCUMENTS

| | | | | | |
|---|---|---|---|---|---|
| 4,569,522 | A | * | 2/1986 | Davies | 463/6 |
| 4,582,324 | A | | 4/1986 | Koza et al. | |
| 4,624,459 | A | | 11/1986 | Kaufman | |
| 4,695,053 | A | | 9/1987 | Vazquez, Jr. et al. | |
| 4,840,382 | A | | 6/1989 | Rubin | |
| 4,991,848 | A | | 2/1991 | Greenwood et al. | |
| 5,178,390 | A | | 1/1993 | Okada | |
| 5,205,555 | A | | 4/1993 | Hamano | |
| 5,342,047 | A | | 8/1994 | Heidel et al. | |
| 5,456,465 | A | | 10/1995 | Durham | |
| 5,524,888 | A | | 6/1996 | Heidel | |
| 5,536,016 | A | | 7/1996 | Thompson | |
| 5,542,669 | A | | 8/1996 | Charron et al. | |
| 5,560,603 | A | | 10/1996 | Seelig et al. | |
| 5,611,535 | A | | 3/1997 | Tiberio | |
| 5,695,402 | A | | 12/1997 | Stupak | |
| 5,711,525 | A | | 1/1998 | Breeding | |
| 5,769,716 | A | | 6/1998 | Saffari et al. | |
| 5,772,509 | A | | 6/1998 | Weiss | |
| 5,775,692 | A | | 7/1998 | Watts et al. | |
| 5,788,573 | A | | 8/1998 | Baerlocher et al. | |
| 5,823,872 | A | * | 10/1998 | Prather et al. | 463/6 |
| 5,823,874 | A | | 10/1998 | Adams | |
| 5,833,538 | A | | 11/1998 | Weiss | |
| 5,848,932 | A | | 12/1998 | Adams | |
| 5,851,148 | A | | 12/1998 | Brune et al. | |
| 5,855,514 | A | * | 1/1999 | Kamille | 463/17 |
| 5,873,781 | A | | 2/1999 | Keane | |
| 5,882,261 | A | | 3/1999 | Adams | |
| 5,902,184 | A | | 5/1999 | Bennett et al. | |
| 5,911,418 | A | | 6/1999 | Adams | |
| 5,931,467 | A | * | 8/1999 | Kamille | 273/139 |
| 5,947,820 | A | | 9/1999 | Morro et al. | |
| 5,951,397 | A | | 9/1999 | Dickinson | |
| 5,964,463 | A | | 10/1999 | Moore, Jr. | |
| 5,967,894 | A | | 10/1999 | Kinoshita et al. | |
| 5,980,384 | A | | 11/1999 | Barrie | |
| 5,984,781 | A | | 11/1999 | Sunaga | |
| 5,996,997 | A | * | 12/1999 | Kamille | 273/139 |
| 5,997,400 | A | | 12/1999 | Seelig et al. | |
| 5,997,401 | A | | 12/1999 | Crawford | |
| 6,004,207 | A | | 12/1999 | Wilson, Jr. et al. | |
| 6,015,346 | A | | 1/2000 | Bennett | |
| 6,017,033 | A | | 1/2000 | Keller | |
| 6,019,369 | A | | 2/2000 | Nakagawa et al. | |
| 6,033,307 | A | | 3/2000 | Vancura | |
| 6,050,567 | A | * | 4/2000 | Zucco | 273/246 |
| 6,056,642 | A | | 5/2000 | Bennett | |
| 6,059,289 | A | | 5/2000 | Vancura | |
| 6,059,658 | A | | 5/2000 | Mangano et al. | |
| 6,062,980 | A | | 5/2000 | Luciano | |
| 6,089,976 | A | | 7/2000 | Schneider et al. | |
| 6,089,977 | A | | 7/2000 | Bennett | |
| 6,089,978 | A | | 7/2000 | Adams | |
| 6,093,102 | A | | 7/2000 | Bennett | |
| 6,102,798 | A | | 8/2000 | Bennett | |
| 6,120,031 | A | | 9/2000 | Adams | |
| 6,126,541 | A | | 10/2000 | Fuchs | |
| 6,126,542 | A | | 10/2000 | Fier | |
| 6,142,873 | A | | 11/2000 | Weiss et al. | |
| 6,142,874 | A | | 11/2000 | Kodachi et al. | |
| 6,142,875 | A | | 11/2000 | Kodachi et al. | |
| 6,146,273 | A | | 11/2000 | Olsen | |
| 6,159,095 | A | | 12/2000 | Frohm et al. | |
| 6,159,096 | A | | 12/2000 | Yoseloff | |
| 6,159,097 | A | | 12/2000 | Gura | |
| 6,159,098 | A | | 12/2000 | Slomiany et al. | |
| 6,162,121 | A | | 12/2000 | Morro et al. | |
| 6,168,520 | B1 | | 1/2001 | Baerlocher et al. | |
| 6,168,523 | B1 | | 1/2001 | Piechowiak et al. | |
| 6,173,955 | B1 | | 1/2001 | Perrie et al. | |
| 6,174,233 | B1 | | 1/2001 | Sunaga et al. | |
| 6,174,235 | B1 | | 1/2001 | Walker et al. | |
| 6,190,254 | B1 | | 2/2001 | Bennett | |
| 6,190,255 | B1 | | 2/2001 | Thomas et al. | |
| 6,203,429 | B1 | | 3/2001 | Demar et al. | |
| 6,210,279 | B1 | | 4/2001 | Dickinson | |
| 6,213,876 | B1 | | 4/2001 | Moore, Jr. | |
| 6,224,483 | B1 | | 5/2001 | Mayeroff | |
| 6,231,442 | B1 | | 5/2001 | Mayeroff | |
| 6,231,445 | B1 | | 5/2001 | Acres | |
| 6,237,913 | B1 | * | 5/2001 | Kamille | 273/139 |
| 6,261,177 | B1 | | 7/2001 | Bennett | |
| 6,302,790 | B1 | | 10/2001 | Brossard | |
| 6,305,686 | B1 | | 10/2001 | Perrie et al. | |
| 6,309,300 | B1 | | 10/2001 | Glavich | |
| 6,328,649 | B1 | | 12/2001 | Randall et al. | |
| 6,375,187 | B1 | | 4/2002 | Baerlocher | |
| 6,398,218 | B1 | | 6/2002 | Vancura | |
| 6,409,172 | B1 | * | 6/2002 | Vancura | 273/256 |
| 6,464,581 | B1 | * | 10/2002 | Yoseloff et al. | 463/20 |
| 6,494,785 | B1 | * | 12/2002 | Gerrard et al. | 463/20 |
| 6,506,118 | B1 | | 1/2003 | Baerlocher et al. | |
| 6,514,141 | B1 | | 2/2003 | Kaminkow et al. | |
| 6,517,432 | B1 | * | 2/2003 | Jaffe | 463/16 |
| 6,554,704 | B2 | | 4/2003 | Nicastro et al. | |
| 6,569,015 | B1 | | 5/2003 | Baerlocher et al. | |
| 6,582,307 | B2 | | 6/2003 | Webb | |
| 6,599,192 | B1 | | 7/2003 | Baerlocher et al. | |
| 6,602,136 | B1 | | 8/2003 | Baerlocher et al. | |
| 6,602,137 | B2 | | 8/2003 | Kaminkow et al. | |
| 6,607,438 | B2 | | 8/2003 | Baerlocher et al. | |
| 6,632,139 | B1 | | 10/2003 | Baerlocher | |
| 6,632,141 | B2 | | 10/2003 | Webb et al. | |
| 6,645,073 | B2 | * | 11/2003 | Lemay et al. | 463/20 |
| 6,648,754 | B2 | | 11/2003 | Baerlocher et al. | |
| 6,648,759 | B2 | * | 11/2003 | Vancura | 463/20 |
| 6,656,046 | B1 | * | 12/2003 | Yoseloff et al. | 463/20 |
| 6,666,766 | B2 | | 12/2003 | Baerlocher et al. | |
| 6,676,126 | B1 | | 1/2004 | Walker et al. | |
| 6,692,355 | B2 | | 2/2004 | Baerlocher et al. | |
| 6,705,611 | B2 | | 3/2004 | Kato | |
| 6,719,632 | B2 | | 4/2004 | Palmer et al. | |
| 6,722,981 | B2 | | 4/2004 | Kaminkow et al. | |
| 6,722,982 | B2 | | 4/2004 | Kaminkow et al. | |
| 6,726,562 | B2 | | 4/2004 | Vancura | |
| 6,733,389 | B2 | | 5/2004 | Webb et al. | |
| 6,758,747 | B2 | | 7/2004 | Baerlocher | |
| 6,761,633 | B2 | * | 7/2004 | Riendeau et al. | 463/16 |
| 6,767,283 | B1 | * | 7/2004 | Weiss | 463/16 |
| 6,769,985 | B1 | * | 8/2004 | Laakso et al. | 463/25 |
| 6,783,455 | B2 | * | 8/2004 | Glavich | 463/16 |
| 6,786,820 | B2 | * | 9/2004 | Gerrard et al. | 463/20 |
| 6,793,579 | B2 | | 9/2004 | Baerlocher et al. | |
| 6,796,905 | B2 | | 9/2004 | Baerlocher et al. | |
| 6,808,452 | B2 | | 10/2004 | Baerlocher et al. | |
| 6,808,454 | B2 | * | 10/2004 | Gerrard et al. | 463/20 |
| 6,811,483 | B1 | | 11/2004 | Webb et al. | |
| 6,852,030 | B2 | | 2/2005 | Baerlocher et al. | |
| 6,890,257 | B2 | | 5/2005 | Baerlocher | |
| 6,899,623 | B2 | | 5/2005 | Baerlocher | |
| 6,908,383 | B2 | * | 6/2005 | Baerlocher et al. | 463/20 |
| 6,935,955 | B1 | * | 8/2005 | Kaminkow et al. | 463/35 |
| 6,942,566 | B2 | | 9/2005 | Baerlocher et al. | |
| 6,942,567 | B2 | | 9/2005 | Baerlocher et al. | |
| 6,960,132 | B2 | | 11/2005 | Baerlocher et al. | |
| 6,966,833 | B2 | | 11/2005 | Kaminkow et al. | |
| 6,971,953 | B2 | * | 12/2005 | Gerrard et al. | 463/16 |
| 7,001,273 | B2 | | 2/2006 | Baerlocher | |
| 2002/0010018 | A1 | * | 1/2002 | Lemay et al. | 463/20 |
| 2002/0082071 | A1 | * | 6/2002 | Riendeau et al. | 463/16 |
| 2003/0040360 | A1 | | 2/2003 | Kaminkow | |
| 2003/0045350 | A1 | | 3/2003 | Baerlocher et al. | |
| 2003/0060260 | A1 | * | 3/2003 | Gerrard et al. | 463/16 |

| | | | |
|---|---|---|---|
| 2003/0078093 | A1 | 4/2003 | Simms et al. |
| 2003/0162584 | A1 | 8/2003 | Hughs-Baird et al. |
| 2004/0023707 | A1 | 2/2004 | Maya et al. |
| 2004/0038729 | A1 | 2/2004 | Webb et al. |
| 2004/0162128 | A1 | 8/2004 | Baerlocher et al. |
| 2004/0180710 | A1 | 9/2004 | Palmer et al. |
| 2004/0185928 | A1 | 9/2004 | Baerlocher et al. |
| 2004/0214632 | A1 | 10/2004 | Cuddy et al. |
| 2005/0020346 | A1 | 1/2005 | Baerlocher |
| 2005/0032567 | A1 | 2/2005 | Baerlocher et al. |
| 2005/0037829 | A1 | 2/2005 | Baerlocher et al. |
| 2005/0049036 | A1 | 3/2005 | Mead |
| 2005/0054413 | A1 | 3/2005 | Randall et al. |
| 2005/0055115 | A1 | 3/2005 | Gerrard et al. |
| 2005/0101375 | A1 | 5/2005 | Webb et al. |
| 2005/0130729 | A1 | 6/2005 | Baerlocher et al. |
| 2005/0187010 | A1 | 8/2005 | Baerlocher |
| 2005/0266914 | A1 | 12/2005 | Baerlocher et al. |
| 2006/0003837 | A1 | 1/2006 | Baerlocher et al. |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 3/2000 |
| GB | 2 106 293 | A | 4/1983 |
| GB | 2 191 030 | A | 12/1987 |
| GB | 2 225 889 | A | 6/1990 |
| GB | 2 226 436 | A | 6/1990 |
| GB | 2 242 300 | A | 9/1991 |
| WO | WO 9732285 | | 9/1997 |
| WO | WO 00/12186 | | 3/2000 |

OTHER PUBLICATIONS

Chutes & Ladders Game Instructions written by Hasbro-Milton Bradley, published in 1999.
Adders and Ladders Brochure written by Barcrest Ltd., published.
Top Dollar Game Brochures written by IGT, published in 1998.
East Street Brochures and Articles written by Casino Data System, published in 2000.
Monopoly Brochures and Articles written by WMS Gaming, Inc, published in 1998, 1999 and 2000.
Fox "N" Hound Brochure written by IGT, published in 2000.
Elvis Brochure and Article written by IGT, published in 1999.
Addams Family Advertisement and Article written by IGT, Strictly Slots, published in 2000.
American Thunder Screen Shots written by IGT, published in 1998.
Big Bang Piggy Bankin Advertisement written by WMS Gaming, Inc., published prior to 2000.
Blackjack/Twenty-One Description written by Hoyle's Rules of Games, published in 1993.
Bonus Spin Red, White & Blue Advertisement written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
Empire Game Advertisement written by AC Coin, published in 1996.
In Between Game Description written by IGT, available prior to 2000.
Jackpot Party Advertisements and Articles written by WMS Gaming, Inc., published in 1998.
Keep Your Hat On Advertisement written by Aristocrat, published in 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make A Deal Advertisement written by Shuffle Master and IGT, published in 2001.
Let's Make a Deal Game Advertisement written by Bally Gaming Systems, published in 1999.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Chutes & Ladders Game Instructions written by Hasbro-Milton Bradley, published in 1999.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
Texas Tea Advertisement written by IGT, published in 2000.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc., published prior to 2000.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

GAMING DEVICE HAVING A DESTINATION PURSUIT BONUS SCHEME WITH ADVANCE AND SETBACK CONDITIONS

PRIORITY CLAIM

This application is a continuation-in-part of and claims the benefit of U.S. patent application Ser. No. 10/288,750, filed Nov. 6, 2002 now U.S. Pat. No. 6,786,820, which is a continuation of and claims the benefit of U.S. patent application Ser. No. 09/686,409, filed Oct. 11, 2000, now U.S. Pat. No. 6,494,785 B1.

CROSS REFERENCES TO RELATED APPLICATION

This application is related to the following commonly-owned co-pending patent applications: GAMING DEVICE WITH BONUS SCHEME PROVIDING AWARDS ASSOCIATED WITH MOVEMENTS ALONG A PATH," Ser. No. 09/583,429, and "GAMING DEVICE WITH A BONUS SCHEME INVOLVING MOVEMENT ALONG PATHS WITH PATH CHANGE CONDITIONS," Ser. No. 09/686,538.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly in one embodiment to a gaming device which has a bonus scheme which involves moving a symbol toward a destination with the possibility of advance and setback conditions occurring, and in an alternative embodiment, moving a symbol away from a destination with the possibility of advance and setback conditions.

BACKGROUND OF THE INVENTION

Many existing gaming machines, such as traditional slot machines, include bonus rounds. Typically, a bonus round begins when the player reaches a bonus triggering event in the primary game of the gaming device. In slot machines with reels, the triggering event usually occurs when the player reaches a predetermined combination of symbols on the reels. Usually the bonus scheme provides the player with an opportunity to gain bonus value before the bonus round terminates.

Certain bonus schemes involve advancing a symbol from one location to another toward a destination. A player may receive bonus values when landing on various locations, and the player may also receive a relatively high bonus value when the player's symbol reaches the destination. Though these types of bonus schemes may exist, these bonus schemes do not include conditions which automatically move the symbol one or more locations backward.

To increase player enjoyment and excitement, it is desirable to provide players with new bonus schemes for gaming devices which automatically move a player's symbol backward upon the occurrence of predetermined events while the player is attempting to reach a destination or in the alternative to automatically move a player's symbol backward and forward upon the occurrence of predetermined events while the player is attempting to avoid reaching a destination.

SUMMARY OF THE INVENTION

The present invention overcomes the above shortcomings by providing a gaming device and method which has a bonus scheme which includes a plurality of locations, including at least one destination location. The gaming device also includes at least one symbol located at one of these locations. The term location, as used herein, includes any area, position or objective displayed or designated by the gaming device. A destination location is the location pursued by the player and preferably, when the player reaches the destination location, the gaming device awards the player with a relatively high bonus value or the opportunity to gain a relatively high bonus value. The term symbol, as used herein, includes any visual, or audiovisual representation or image of a person, place or thing, in motion or at rest. Preferably, the plurality of locations form a path, and the path can be shaped in any orderly or disorderly form or fashion. Furthermore, it is preferable that a bonus value is associated with each location.

In operation, the symbol begins at a predetermined location. The gaming device then moves the symbol in the direction of the destination location, preferably by enabling the player to push a play button. Depending upon the new location of the symbol, a setback condition may occur or an advance condition may occur. If a setback condition occurs, the gaming device automatically moves the symbol to a predetermined location or a predetermined number of locations away from its current location, in the opposite direction of the destination location. If an advance condition occurs, the gaming device automatically moves the symbol to a predetermined location or a predetermined number of locations from its current location in the direction of the destination location. At any time, the player can stop the bonus round and accept the bonus value associated with the present location. Alternatively, the player can move the symbol forward, preferably by pushing a play button again. With this type of bonus scheme, the gaming device preferably provides the player with a limited number of moves to reach the destination location. In pursuit of this objective, the player faces: (i) a plurality of possible setback conditions; (ii) a plurality of possible advance conditions; and (iii) the option of accepting a bonus value and ending the bonus round or continuing the bonus round and possibly receiving a lower bonus value. The setback conditions hinder the player's advancement, and the advance conditions aid the player in reaching the destination location.

Preferably, this bonus scheme also includes one or more bonus values and one or more terminating conditions associated with predetermined locations. These terminating conditions are predetermined by the gaming device and occur when one or more events occur during the bonus round. Preferably, when the symbol lands on predetermined locations, the gaming device awards the player with bonus values associated therewith. Furthermore, it is preferable that if the player reaches the destination location, the gaming device awards the player with an opportunity to gain a relatively high bonus value. In addition, it is preferable that when the symbol lands on predetermined locations, the gaming device awards the player with bonus values associated therewith and then terminates the bonus round.

In one preferred embodiment, the plurality of locations are formed in a grid-shaped path. Various bonus values are associated with each location. The symbol begins at the bottom left-hand corner of the grid and advances along the rows from the bottom row to the top row. The destination location is located in the top left-hand corner of the grid. This preferred embodiment also includes a setback condition associated with at least one location. When the player reaches such a location, a setback condition occurs and the gaming device automatically relocates the symbol accordingly. In addition, the setback condition may operate as a terminating condition, causing the gaming device to award the player with a bonus value associated with the new location and then terminate the bonus round. When the symbol lands on a predetermined location, an advance condition occurs and the gaming device automatically relocates the symbol accordingly. In addition, if neither a terminating condition nor an advance condition occurs, the gaming device enables the player to terminate the bonus round and accept the bonus value associated with the present location, or to continue moving toward the destination location.

If the player moves the symbol to the destination location or beyond the destination location, the gaming device provides the player with an opportunity to gain a relatively high bonus value. The gaming device displays the possible bonus values which the player can gain. Preferably, the gaming device enables the player to push a play button, and the gaming device awards the player with one of these bonus values, and finally the bonus round terminates.

The present invention provides a gaming device with a bonus scheme which enables the player to move a symbol toward a destination location and provides the player with a relatively high bonus value if the player reaches the destination location. As the player pursues this destination, the player faces: (i) the decision of ending the bonus round with a particular bonus value or continuing and running the risk of receiving a lower bonus value; (ii) setback conditions which hinder the player's progress in reaching the destination location; and (iii) advance conditions which aid the player in reaching the destination location.

In an alternative embodiment, rather than associating a plurality of locations with awards, setback conditions and advance conditions, the gaming device determines as the game is played whether to select an advance condition (i.e., advance the player symbol toward the destination location) or whether to select a setback condition (i.e., move the player symbol away from the destination location) and how many locations to move the player symbol. In one embodiment, each advance condition and each setback condition is associated with a number of location moves and a probability of being selected by the gaming device. For example, an advance condition of ten locations will have a different chance of being selected by the gaming device than a setback condition of four locations or an advance condition of six locations. In another embodiment, each advance condition and each setback condition is not associated with a number of location moves. In this embodiment, as described above, the gaming device selects, based on associated probabilities, whether the player symbol's next move will be an advance condition or a setback condition and then the gaming device determines the number or amount of location moves the player symbol will be moved. In this embodiment, each number of location moves is preferably associated with a probability of being selected. That is, whenever the player symbol is moved to one of the plurality of locations, the gaming device determines, based on the associated probabilities, whether to advance the player symbol toward the destination location or whether to move the player symbol away from the destination location and how many locations to move the player symbol.

In an alternative embodiment, in addition to determining the player symbol's next move, the gaming device also determines whether to provide the player an award and if so, how much of an award to provide the player. In this embodiment, each award is preferably associated with a probability of being selected and the gaming device selects each award based on the associated probabilities.

In one alternative embodiment of the present invention, the player is not provided an award for the symbol reaching or moving beyond or past the destination location, but rather, the player is provided an award based on how many locations the symbol is moved to before the symbol reaches or is moved beyond a predetermined location, such as the destination location. In one embodiment, the player's objective is for the symbol to avoid reaching the destination location because once the symbol reaches or is moved beyond the destination location, the game ends. That is, if the symbol is moved or relocated (upon the occurrence of an advance condition) to or beyond the destination location, then the symbol movement stops, the player is provided no more awards and the game ends. In this embodiment, the player is provided any award associated with the player symbol's current location and as long as the symbol continues moving from location to location, the player will continue accumulating the awards associated with a plurality of the locations. In another embodiment, the award provided to the player is based solely on the number of locations the player symbol moves to before the player symbol reaches the destination location or beyond. In this embodiment, the more locations the player's symbol moves to before reaching the destination location, the greater the award that will be provided to the player.

In an alternative embodiment, the less locations the player's symbol moves to before reaching the destination location, the greater the award that will be provided to the player. In this embodiment, the player's objective is to reach the destination location with as little moves as possible because the less moves it takes to reach the destination location, the greater the award.

In another embodiment, the award provided to the player is based on a combination of the number of locations the player symbol moves to before the player symbol reaches the destination location and the awards associated with any of the locations the player symbol is moved to.

Unlike the embodiments described above wherein the setback conditions hinder the progress of the player's symbol toward the destination and the advance conditions aid the progress of the player's symbol toward the destination, in this embodiment, the setback conditions aid the player and the advance conditions hinder the progress of the player's symbol toward the destination. That is, since the player's objective in this embodiment is to avoid reaching the destination location, any condition that moves the symbol closer to the destination location and thus closer to the end of the game is detrimental to the player's continuation of the game. On the other hand, if the symbol is close to the destination location, then a setback condition aids the player because without relocating the symbol away from the destination location, the symbol may be moved to or beyond the destination location and thus ending the game.

In an alternative embodiment of the present invention, the player is not provided an award for the symbol reaching or moving beyond the destination location, but rather, the player is provided an award based on how many locations between two predetermined locations, such as the start location and the destination location, that the symbol is moved to before the symbol reaches or is moved beyond one of the two predetermined locations. In this embodiment, unlike the embodiments described above, if the symbol is relocated or moved back to or back beyond the start location (i.e., by a setback condition), the game ends. In one embodiment, the player is provided an award, if any, for each of the locations the player symbol is moved to. In another embodiment, the award provided to the player is based on the number of locations the player symbol moves to before the player symbol is moved to a location that is not between the two predetermined locations.

In an alternative embodiment, the less locations the player's symbol moves to before reaching a location that is not between the two predetermined locations, the greater the award that will be provided to the player. In another embodiment, the award provided to the player is based on a combination of the number of locations the player symbol moves to before the player symbol is moved to a location that is not between the two predetermined locations and any award provided for any of the locations the player symbol is moved to.

It should also be appreciated that in this embodiment, depending on the current location of the symbol, both the setback conditions and the advance conditions can each hinder or aid the player. For example, if the symbol is close to the start location, then a setback condition hinders the player because the setback condition may relocate the symbol back to or beyond the start location thus ending the game. On the other hand, if the symbol is close to the destination location, then a setback condition aids the player because without relocating the symbol further away from the destination location, the symbol may be moved to or beyond the destination location, thus ending the game.

It is therefore an object of the present invention to provide a gaming device with a bonus scheme which includes advance and setback conditions.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
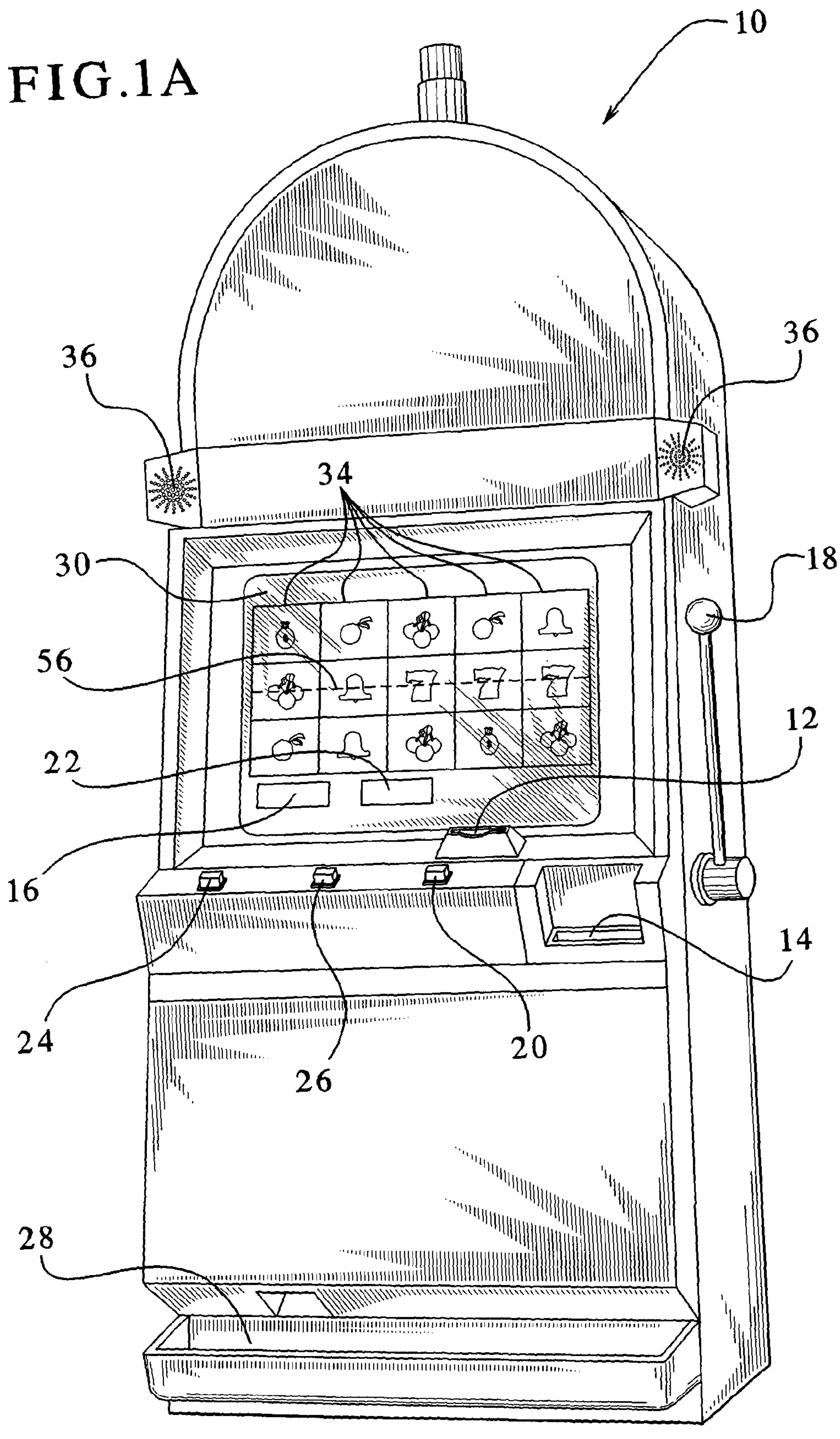
FIG. 1A is a perspective view of one embodiment of the gaming device of the present invention.
Figure 1B:
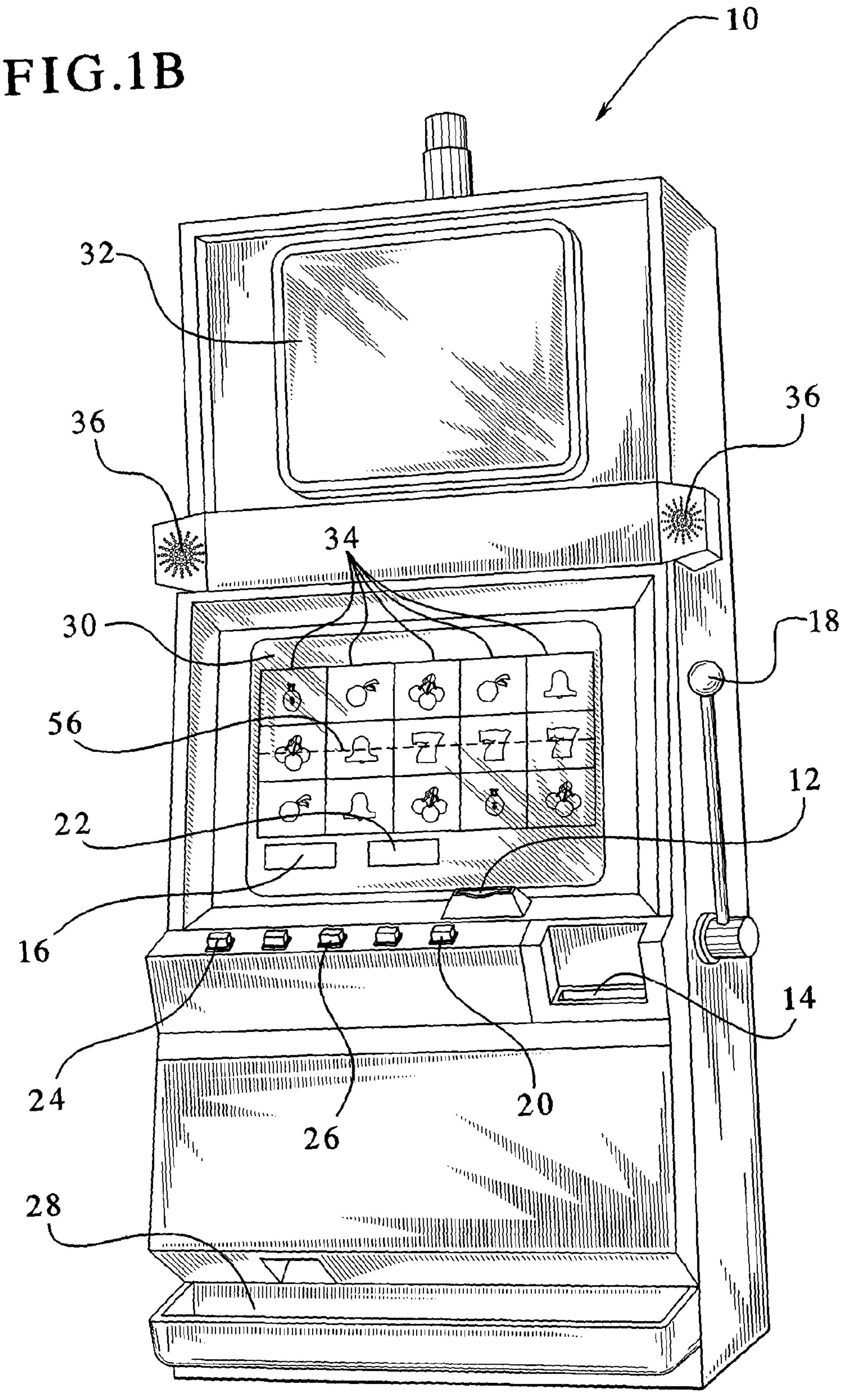
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
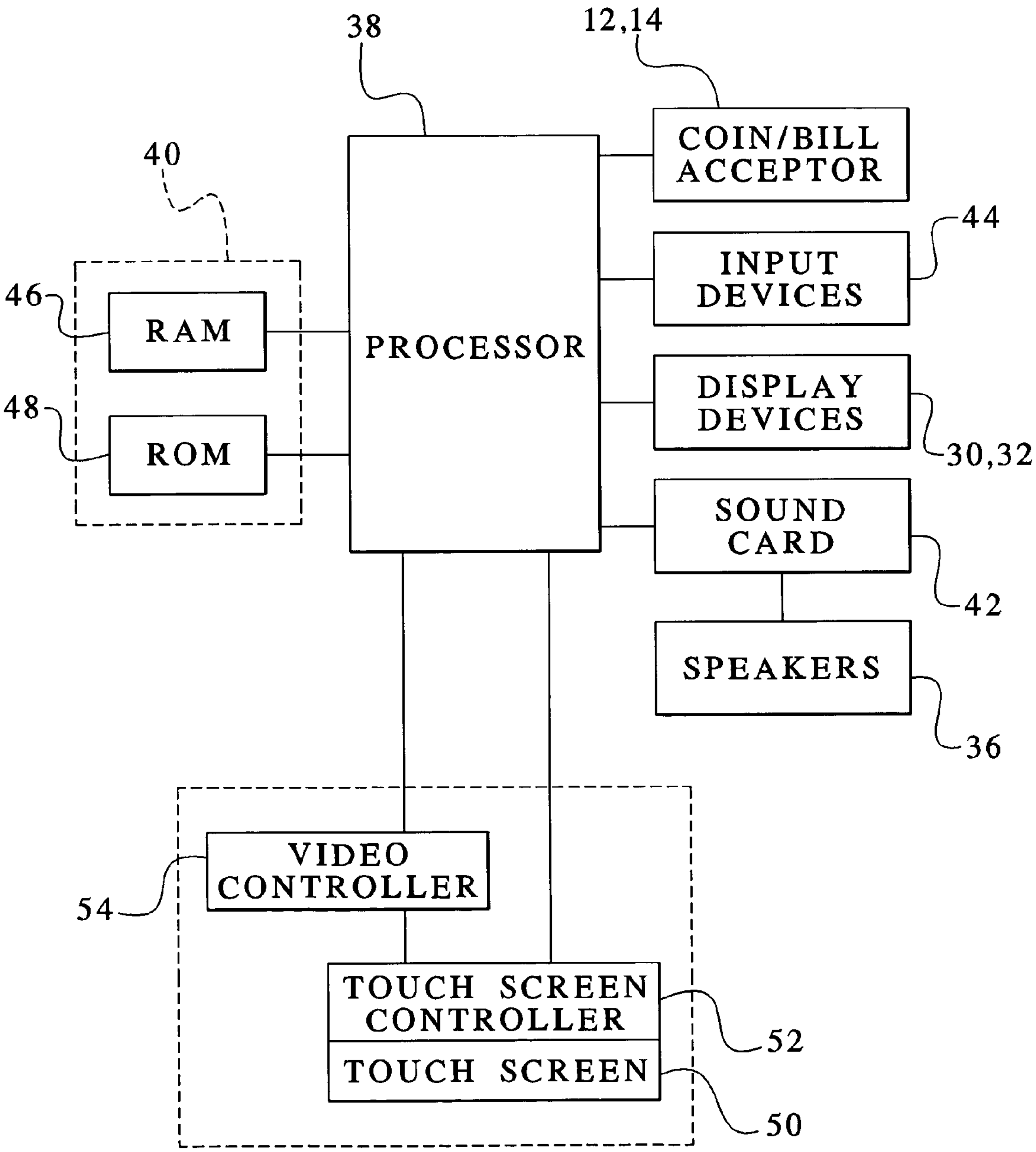
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Scheme

If a player achieves a bonus triggering or qualifying condition while playing the game, the gaming device 10 automatically initiates the bonus round of the present invention. The bonus scheme of the present invention includes a plurality of locations 100, one or more destination locations 102 and at least one symbol 104. The locations 100 can be arranged in any orderly or disorderly fashion or pattern. Preferably, locations 100 are arranged in the shape of a non-cyclical path 106.

Figure 6:
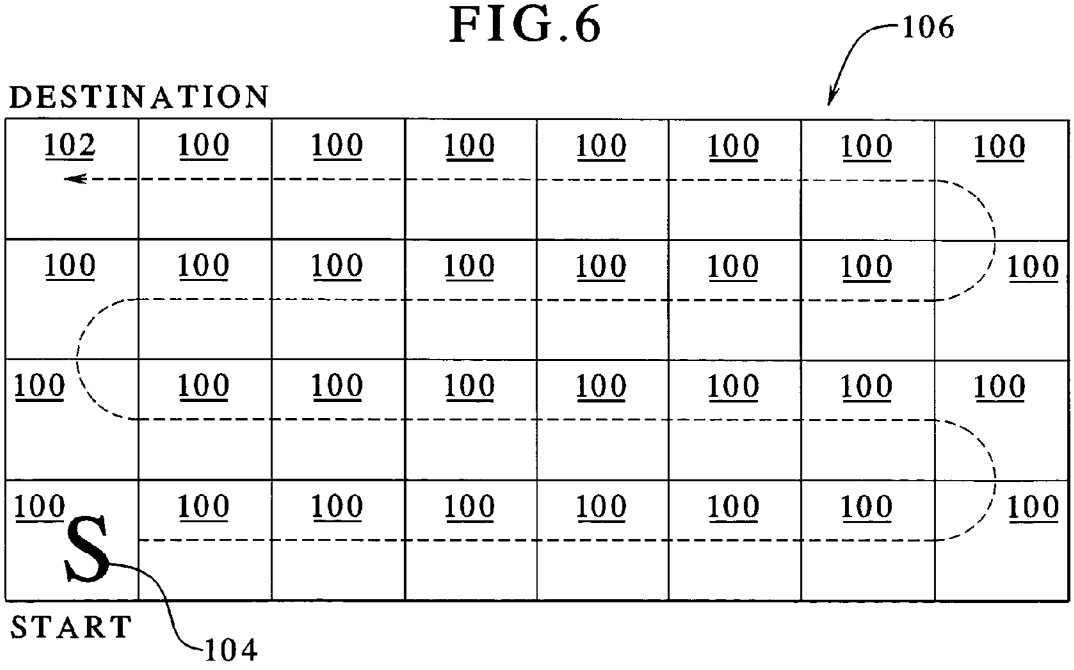
FIG. 6 is an elevation view of a grid-shaped path, including the locations and symbol in one embodiment of the present invention.

As shown in FIG. 3, a path 106 can consist of a plurality of locations 100 adjoining one another. As shown in FIG. 4, a path 106 can be in the shape of a line. Furthermore, as shown in FIG. 6, a path 106 can be in the shape of a grid, including a plurality of locations 100. It should be appreciated that the path shapes shown in FIGS. 3, 4 and 6 are merely illustrative paths 106 and that the present invention can include other types and shapes of paths 106.

Figure 4A:
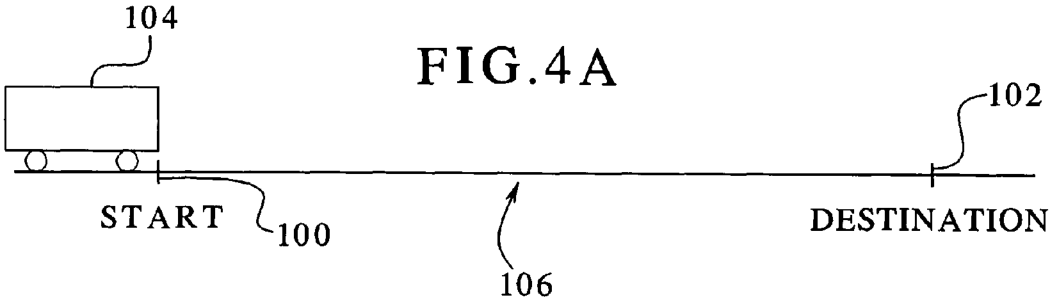
FIGS. 4A, 4B, 4C, 4D and 4E are elevation views of a path and a symbol showing the initial position of the symbol and four moves made by the symbol in another embodiment of the present invention.
Figure 4B:
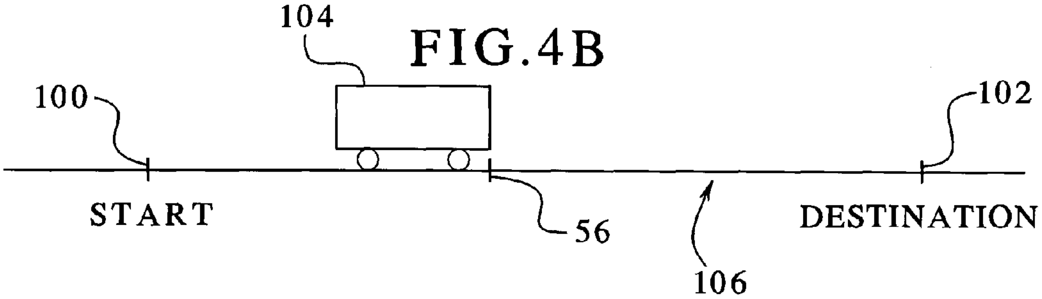
Figure 4C:
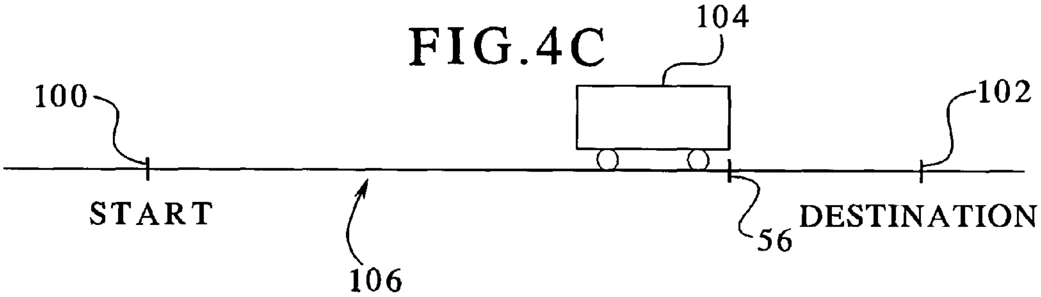
Figure 4D:
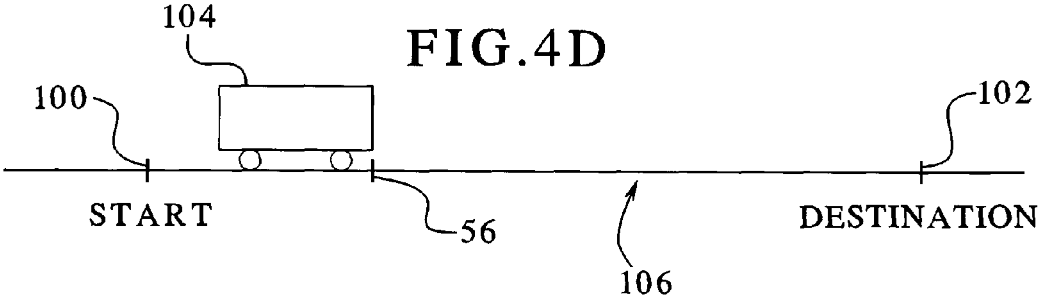
Figure 4E:
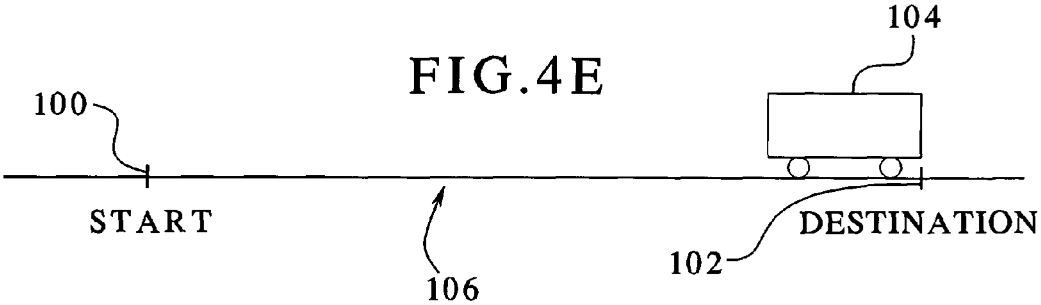
Figure 5:
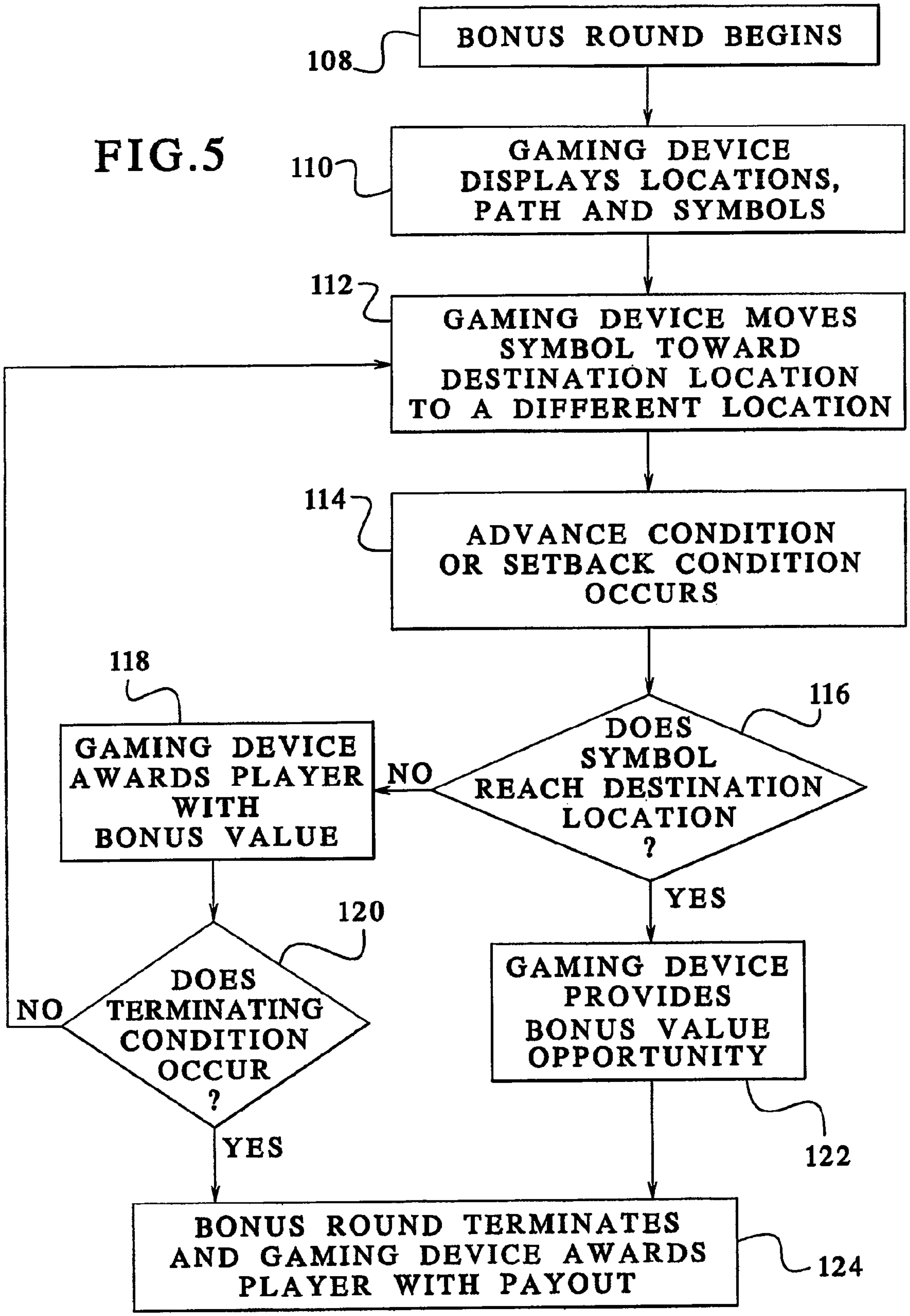
FIG. 5 is a flow diagram of one embodiment of the present invention.

With reference to FIG. 5, in operation after the bonus round begins, the gaming device displays the locations 100 (which form the path 106) and the symbol 104, as indicated by blocks 108 and 110. The starting location of symbol 104 and the destination location 102 can be located anywhere on the path 106 and are preferably predetermined by the gaming device. The examples shown in FIGS. 3, 4 and 6 indicate particular start locations 100 and destination locations 102 merely for illustrative purposes. After displaying the locations 100 and symbol 104, the gaming device then moves the symbol 104 to a different location 100 in the direction of the destination location 102, as indicated by block 112.

Figure 3A:
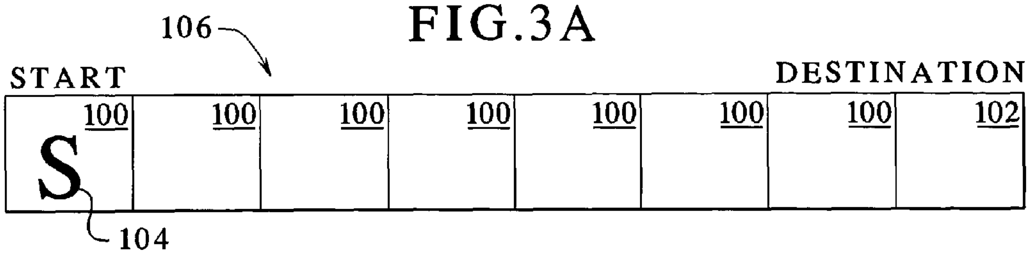
FIGS. 3A, 3B, 3C, 3D and 3E are elevation views of a path and a symbol showing the initial position of the symbol and four moves made by the symbol in one embodiment of present invention.
Figure 3B:
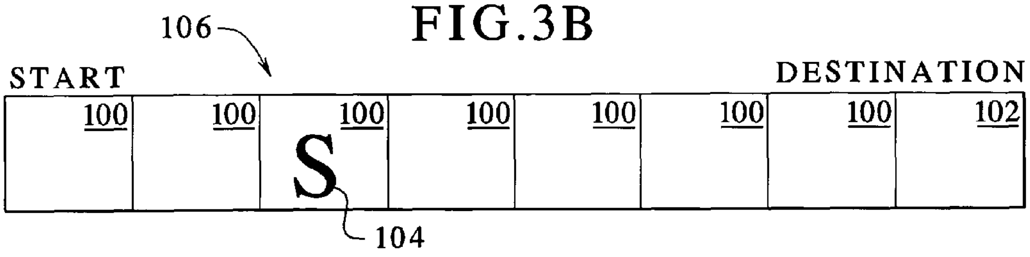

The gaming device can cause this move automatically based upon a predetermined computer program. However, it is preferable that the gaming device causes this move by enabling the player to push the play button 20. After the player pushes the play button 20, the gaming device preferably determines the new location 100 by random generation calculations or other calculations involving predetermined probabilities and/or outcomes. The example shown in FIG. 3 shows a path 106 at different times as the symbol 104 moves four times during a bonus round. FIG. 3A shows the starting location of symbol 104. FIG. 3B shows the initial move of symbol 104 after the player pushed the play button 20 for the first time. Similarly, FIG. 4A shows the starting location of symbol 104 in a different path 106, and FIG. 4B shows the first move of this symbol 104.

Referring again to FIG. 5, after the symbol 104 is moved, either an advanced condition occurs or a setback condition occurs, as indicated by block 114. If an advance condition occurs, the gaming device will automatically move symbol 104 toward the destination location 102 to a predetermined location 100. The move caused by an advance condition is illustrated in FIGS. 3C and 4C.

If instead of reaching an advance condition, the player reaches a setback condition, the gaming device will automatically move symbol 104 away from the destination location 102. Specifically where the gaming device moves symbol 104 after an advance or setback condition occurs is preferably predetermined by the gaming device. However, the present invention can be adapted so that such a move is determined randomly after a player pushes the play button 20. As indicated by diamond 116 and block 118 in FIG. 5, if the symbol 104 does not reach or move beyond the destination location 102 after an advance condition occurs, or if a setback condition occurs preventing the symbol 104 from reaching or moving beyond the destination location 102, the gaming device preferably enables the player to make a decision: to accept a particular bonus value associated with the present location and end the bonus round, or to continue the bonus round with the possibility of receiving a higher or lower bonus value.

Accepting a bonus value functions as a terminating condition. It is also preferable that one or more of the setback conditions function as a terminating condition. However, any event or sequence of events can result in a terminating condition as is predetermined by the gaming device. Preferably, the gaming device provides the player with a limited number of moves or opportunities to move symbol 104 to the destination location 102. When this number is exhausted, a terminating condition occurs and the bonus round terminates. If a terminating condition occurs, the gaming device terminates the bonus round, as indicated by diamond 120 and block 124. In an alternative embodiment, a setback condition does not operate as a terminating condition and, as indicated by diamond 120 and block 112, after a setback condition occurs the gaming device will enable the player to push the play button 20 again in order to move symbol 104 toward the destination location 102. This process continues until the player reaches a terminating condition or the destination location 102.

Figure 3C:
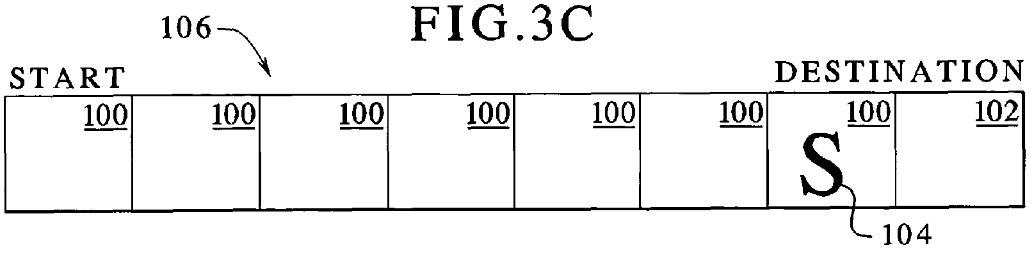
Figure 3D:
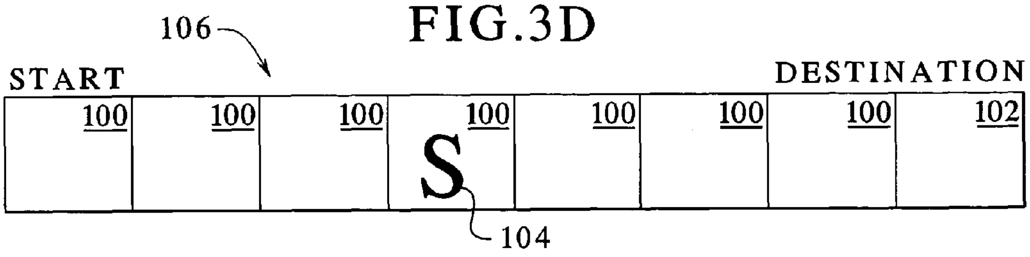
Figure 3E:
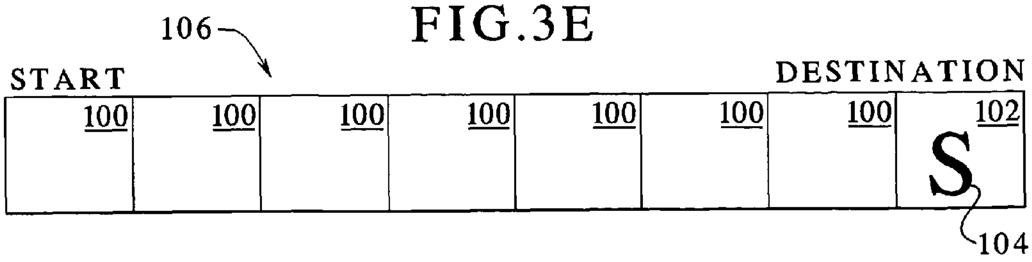

In the example shown in FIG. 3C, after pushing play button 20 for a second time, the player came within one location from reaching the destination location 102. However, this particular location 100 was associated with a setback condition which caused the symbol 104 to move backward three locations as shown in FIG. 3D. Then the player pushed the play button 20 again and finally reached the destination location 102, as shown in FIG. 3E. Likewise with reference to FIG. 4, the player experienced a setback condition as shown in FIG. 4D, and then the player recovered and reached the destination location 102 as shown in FIG. 4E. Preferably a player can reach a destination location 102 by positioning symbol 104 on the destination location 102 or by receiving a move which would locate symbol 104 beyond the destination location 102. Though in these examples the player reached the destination location 102, it should be understood that this will not always be the case, and will preferably be based on the winning percentages desired by the implementation of the gaming device and on the random determination made by the gaming machines.

Referring back to FIG. 5, after the player reaches the destination location 102, the gaming device can automatically award the player with a bonus value associated with the destination location 102. However, it is preferable that the gaming device provides the player with an opportunity to gain a bonus value associated with reaching the destination location 102, as indicated by block 122. Here, the gaming device displays a set of bonus values to the player, the player pushes the play button 20 and the gaming device awards the player with one of the values in the set. These bonus values are preferably relatively high in comparison to any bonus values associated with any of the locations 100. As indicated by block 124 in FIG. 5, after the player reaches a terminating condition or reaches the destination location 102, the bonus round terminates and the gaming device provides the player with any payout due to the player.

In one preferred embodiment shown in FIG. 6, the player moves the symbol 104 in an S-shaped pattern from the bottom of a grid toward the top of a grid. Preferably, as indicated in FIG. 6, the starting location 100 is positioned at the bottom left-hand corner of the path 106, and the destination location 102 is positioned at the top left-hand corner of the path 106. Each of the locations 100 are associated with various bonus values (not shown). When the symbol 104 moves to a location 100, the gaming device enables the player to accept the associated bonus value and terminate the bonus round or to continue the bonus round. If the player continues, the player risks ending the bonus round with a bonus value lower than what the player could have received.

In addition, one or more of the locations 100 are associated with setback conditions, and one or more of these setback conditions may also operate as terminating conditions as discussed above. Furthermore, one or more of the locations 100 are associated with advance conditions which automatically move the symbol 104 toward the destination location a predetermined number of locations 100, as discussed above. If the symbol 104 reaches or would move beyond the destination location 102 the gaming device provides the player with an opportunity to gain a relatively high bonus value 126, shown in FIG. 6. Here, the gaming device displays a set of bonus values 126 and enables the player to push the play button. After pushing the play button, the gaming device provides the player with one of these bonus values 126.

Figure 7:
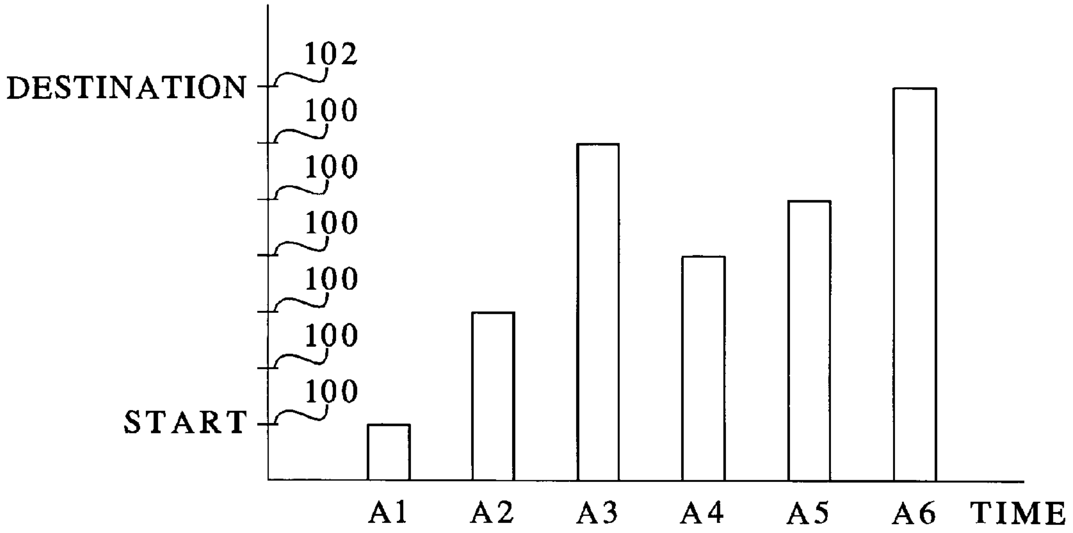
FIG. 7 is a bar graph of the locations, destination location and symbol movement in one embodiment of the present invention.

In an alternative embodiment illustrated in FIG. 7, moving to a location 100 can be the equivalent of achieving an objective, and the ultimate objective can be the destination location 102. The player begins at one of a plurality of starting locations 100, and the gaming device provides the player with a predetermined number of attempts to reach the destination location 102. In FIG. 7, the attempts are indicated by the notation A1, A2, A3, A4, A5 and A6. With attempts A1 and A2, the player moved to locations 100 associated with certain advanced conditions. The advance is indicated by elongation of the bars in FIG. 7. However, upon attempt A3, the player reached a setback condition, but thereafter, the player reached additional advance conditions. Ultimately, upon the sixth attempt, the player reached the destination location 102.

It should be appreciated that the destination location can be an objective in a point-based game. Accordingly, when the player reaches a setback condition, the gaming device can deduct points from the player, and when the player reaches advance conditions the gaming device can provide the player with points. This type of alternative embodiment is applicable to games such as boxing, golf, track and field games, and the like. It should also be appreciated that the locations can be accomplishments or goals included in games which incorporate concepts such as climbing and falling; raising and lowering; and building structures or items which deteriorate or fall apart and must be rebuilt.

In an alternative embodiment, rather than associating a plurality of locations with awards, setback conditions and advance conditions, for each location the player symbol moves to as the game is played, the gaming device determines whether to advance the player symbol toward the destination location or whether to move the player symbol away from the destination location. In one embodiment, each advance condition is associated with a number of moves toward the destination location and a probability of being selected by the gaming device. Moreover, each setback condition is associated with a number of moves away from the destination location and a probability of being selected by the gaming device. For example, an advance condition that moves the player symbol five locations toward the destination location may be associated with a 15% chance of being selected, while a setback condition that moves the player symbol three locations away from the destination location may be associated with a 5% chance of being selected.

In this embodiment, the gaming device selects, based on the associated probabilities, one of the advance conditions or one of the setback conditions and moves the player symbol the number or amount of moves associated with the selected condition. In one embodiment, the probabilities associated with each condition change is dependent on the number of moves the player symbol has made during a particular game sequence. For example, the more moves the player symbol has made, the greater the probability that the gaming device selects an advance condition associated with a high number of moves toward the destination location.

In another embodiment, each advance condition and each setback condition is not associated with a number of moves, but rather, the gaming device determines how many locations to move the player symbol as the game is played. In this embodiment, each advance condition and each setback are preferably associated with a probability of being selected by the gaming device as described above and each number of location moves (i.e., move 2, 3 or 4 locations) is also preferably associated with a probability of being selected. That is, whenever the player symbol is moved to one of the plurality of locations, the gaming device determines, based on the associated probabilities, whether to advance the player symbol toward the destination location or to move the player symbol away from the destination location and how many locations to move the player symbol.

In another embodiment, in addition to selecting, based on probabilities, whether the player obtains an advance condition or a setback condition, the gaming device also determines whether to provide the player an award and how much of an award to provide the player. In this embodiment, each award is associated with a probability of being selected by the gaming device. In this embodiment, it is preferable that the greater the value of the award, the lower the probability associated with that award. For example, an award of ten credits may be associated with a 10% chance of being selected by the gaming device while an award of five-hundred credits may be associated with a 1% chance of being selected by the gaming device.

Referring now to FIGS. 8A to 8G, in one embodiment of the present invention, the player is not provided an award for the symbol reaching or moving beyond the destination location, but rather, the player is provided an award based on how many locations the symbol is moved to before the symbol reaches or is moved beyond or past a predetermined location, such as the destination location. In one embodiment, the player's objective is for the symbol to avoid reaching the destination location because once the symbol reaches or is moved beyond the destination location, the game ends and the player is provided no more awards. In other words, as long as the symbol continues moving from location to location, the player will continue accumulating the awards associated with a plurality of the locations.

Figure 8A:
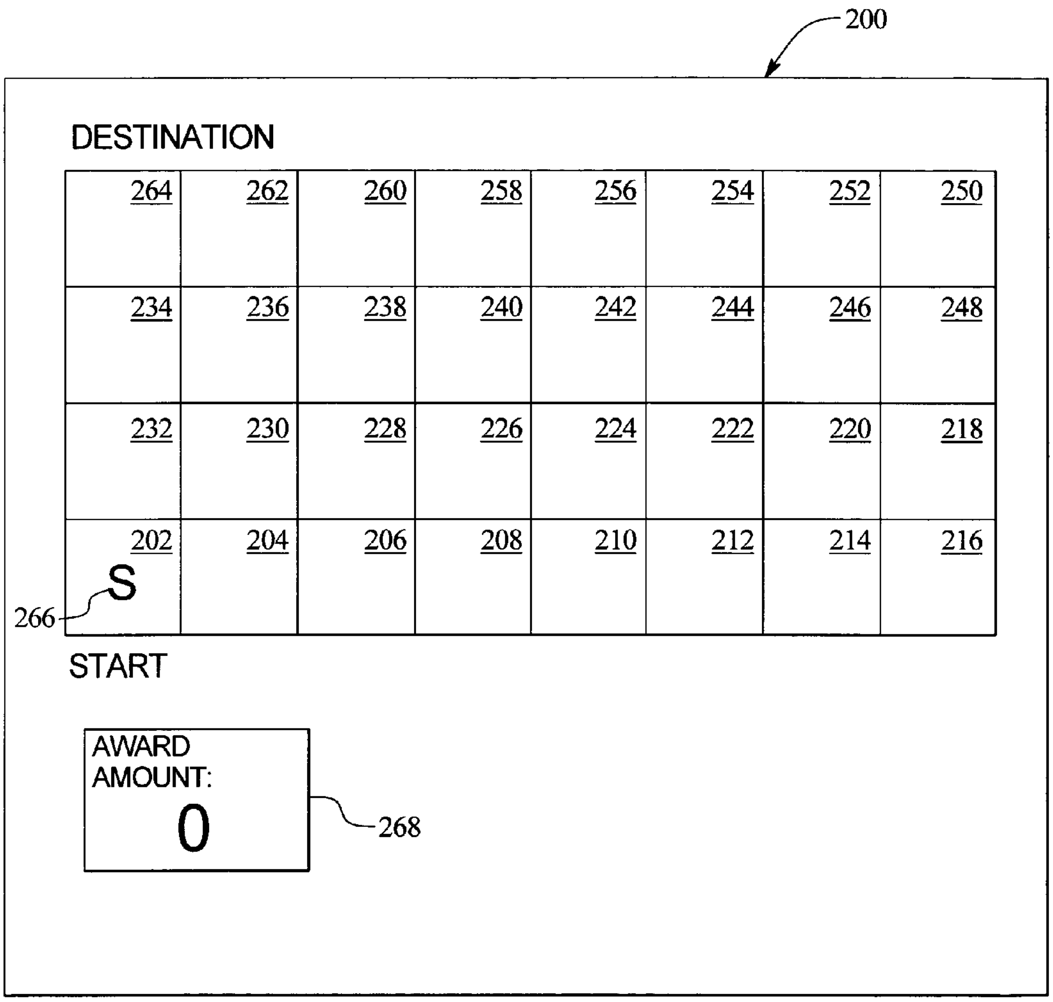
FIGS. 8A, 8B, 8C, 8D, 8E, 8F and 8G are elevation views of one alternative embodiment of the present invention wherein the player's objective is to avoid reaching the destination location.

As illustrated in FIG. 8A, in this embodiment, the gaming device provides a screen or display 200 which enables a player to obtain one or more awards. The gaming device provides a plurality of locations 202, 204, 206, 208, 210, 212, 214, 216, 218, 220, 222, 224, 226, 228, 230, 232, 234, 236, 238, 240, 242, 244, 246, 248, 250, 252, 254, 256, 258, 260, 262 and 264 including a start location 202 and a destination location 264. As described above, in one embodiment a plurality of the locations are associated with awards, at least one and preferably a plurality of the locations are associated with setback conditions and at least one and preferably a plurality of locations are associated with advance conditions. In this embodiment, the number of awards, advance conditions and setback conditions that are associated with the plurality of locations is preferably weighted. That is, each award, each advance condition and each setback condition are associated with a probability of being associated with one of the plurality of locations.

In this embodiment, as illustrated in FIG. 8A, the player symbol 266 begins the game located at the start location. As described above, the start location and the destination location can be any of the plurality of locations. In this embodiment, the locations are arranged in the shape of a grid and the player symbol will move in an S-shaped pattern from the bottom of the grid (i.e., the start location 202) to the top of the grid (i.e., the destination location 264). The gaming device also provides an award display or indicator 268 that displays the current award amount accumulated by or provided to the player.

Figure 8B:
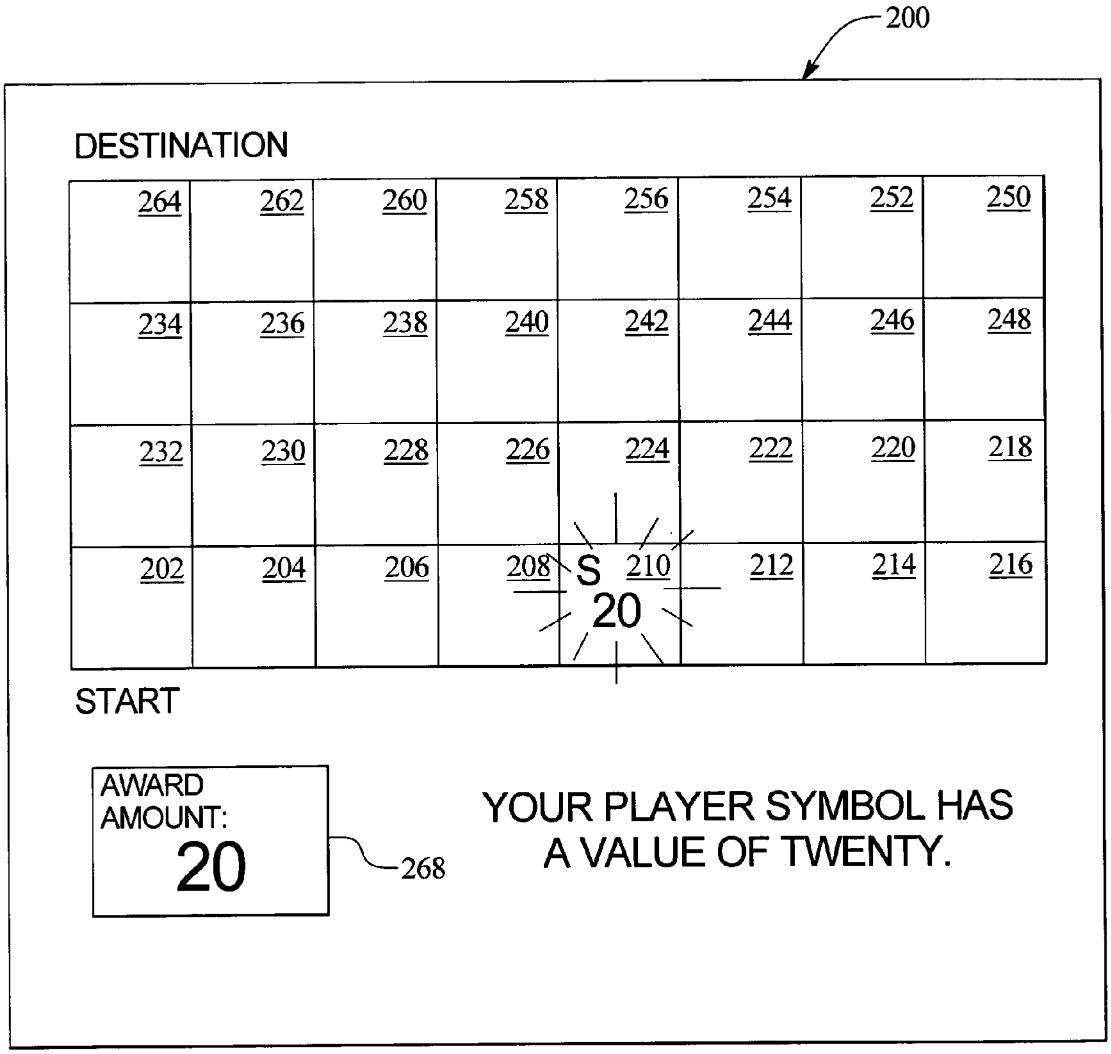

As illustrated in FIGS. 8A and 8B, upon the initiation of the game, in one embodiment, the gaming device moves the player symbol four locations toward the destination location to highlighted location 210. An award of twenty is revealed to be associated with the location of the player symbol. The revealed award is provided to the player. Accordingly, the award display 268 is updated to reflect this provided award amount. Appropriate messages such as "YOUR PLAYER SYMBOL LOCATION HAS A VALUE OF 20" are preferably provided to the player visually, or through suitable audio or audiovisual displays.

Figure 8C:
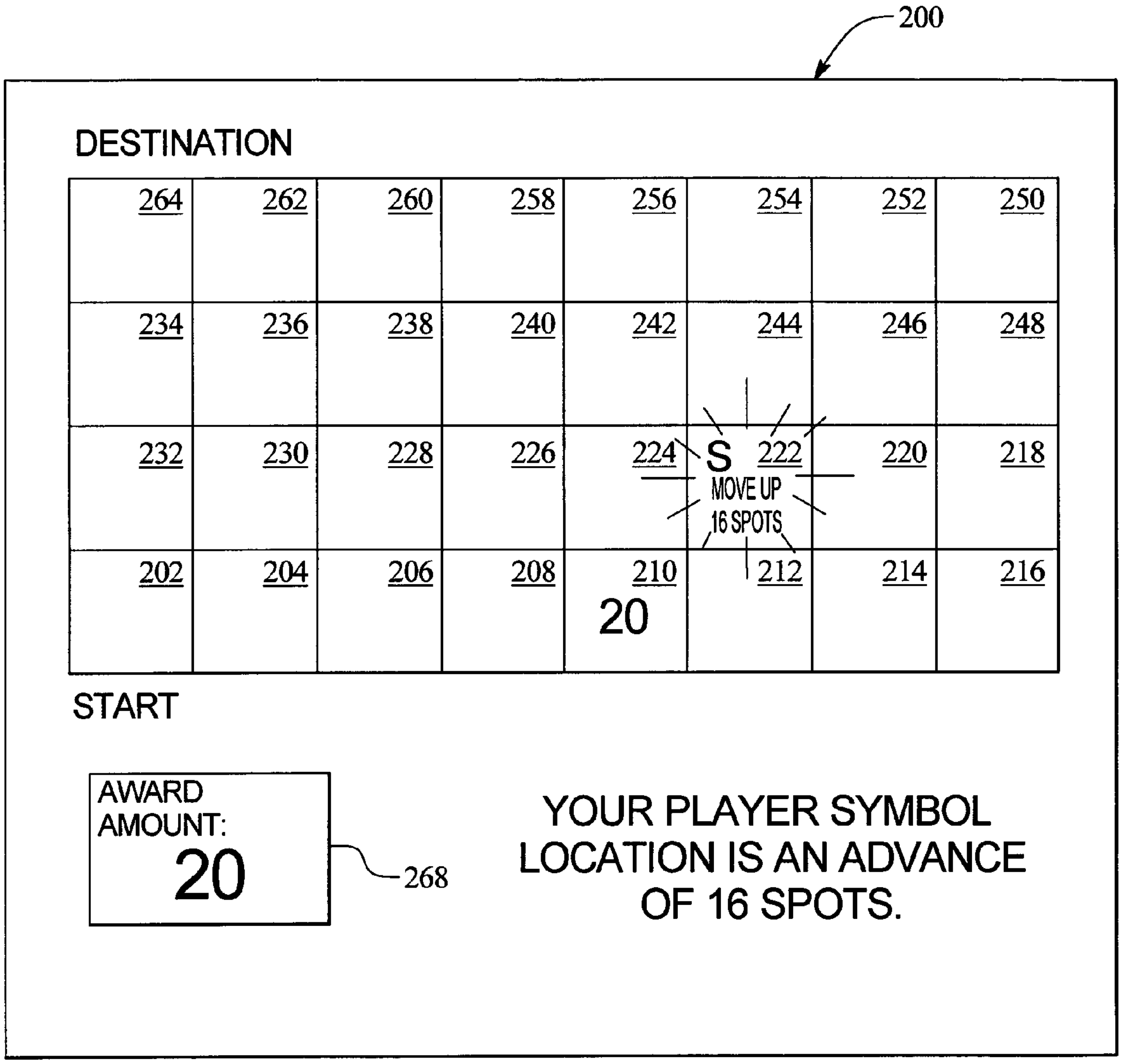

In this embodiment, since the player symbol has not reached the destination location, the gaming device moves the player symbol at least one location toward the destination location. As illustrated in FIG. 8C, the gaming device moves the player symbol six locations toward the destination location to highlighted location 222. Location 222 is revealed to be associated with an advance condition of advancing sixteen locations toward the destination location. Appropriate messages such as "YOUR PLAYER SYMBOL LOCATION IS AN ADVANCE OF 16 SPOTS" are preferably provided to the player visually, or through suitable audio or audiovisual displays.

Figure 8D:
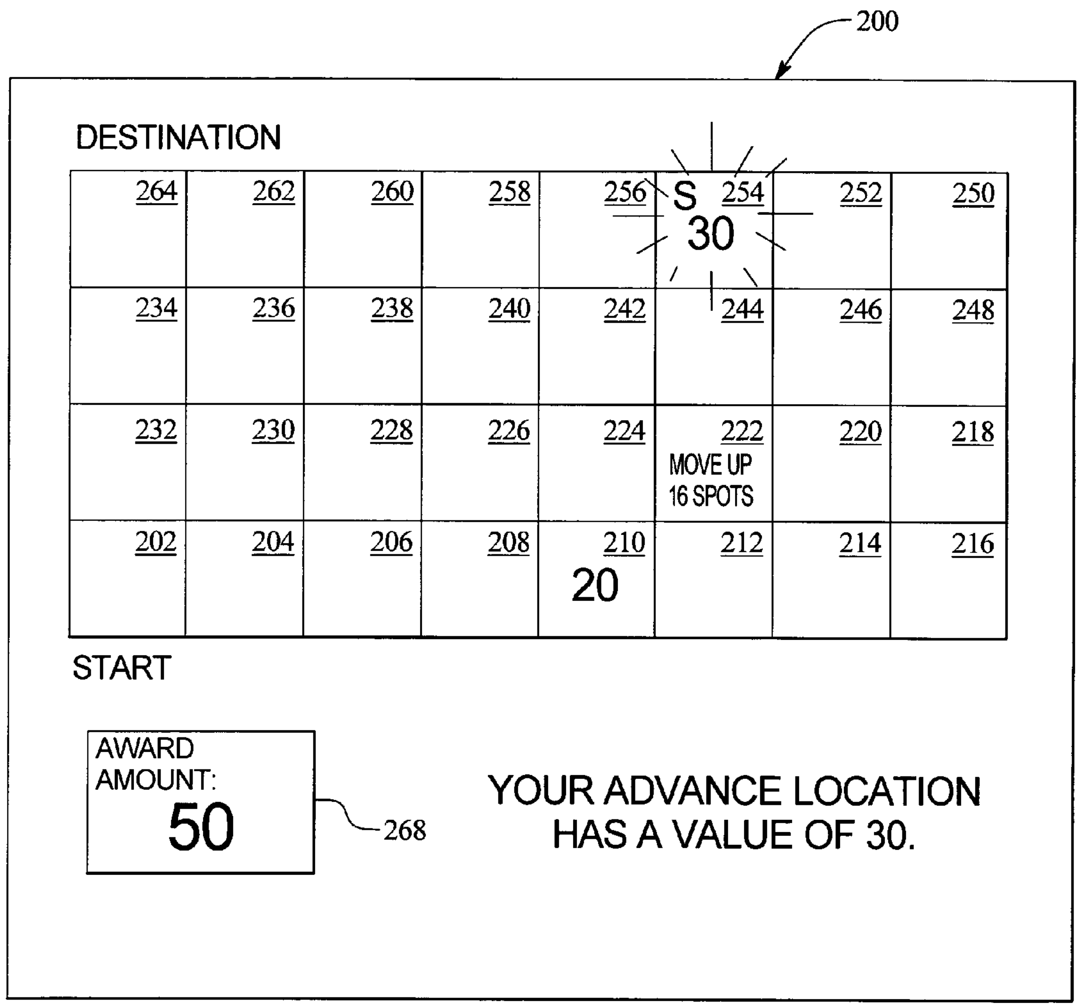

As illustrated in FIG. 8D, the player symbol is accordingly moved sixteen locations to highlighted location 254 which is revealed to be associated with an award of thirty. The revealed award is provided to the player and the award display 268 is updated to reflect the current total provided award amount. Appropriate messages such as "YOUR ADVANCED LOCATION HAS A VALUE OF 30" are preferably provided to the player visually, or through suitable audio or audiovisual displays.

Figure 8E:
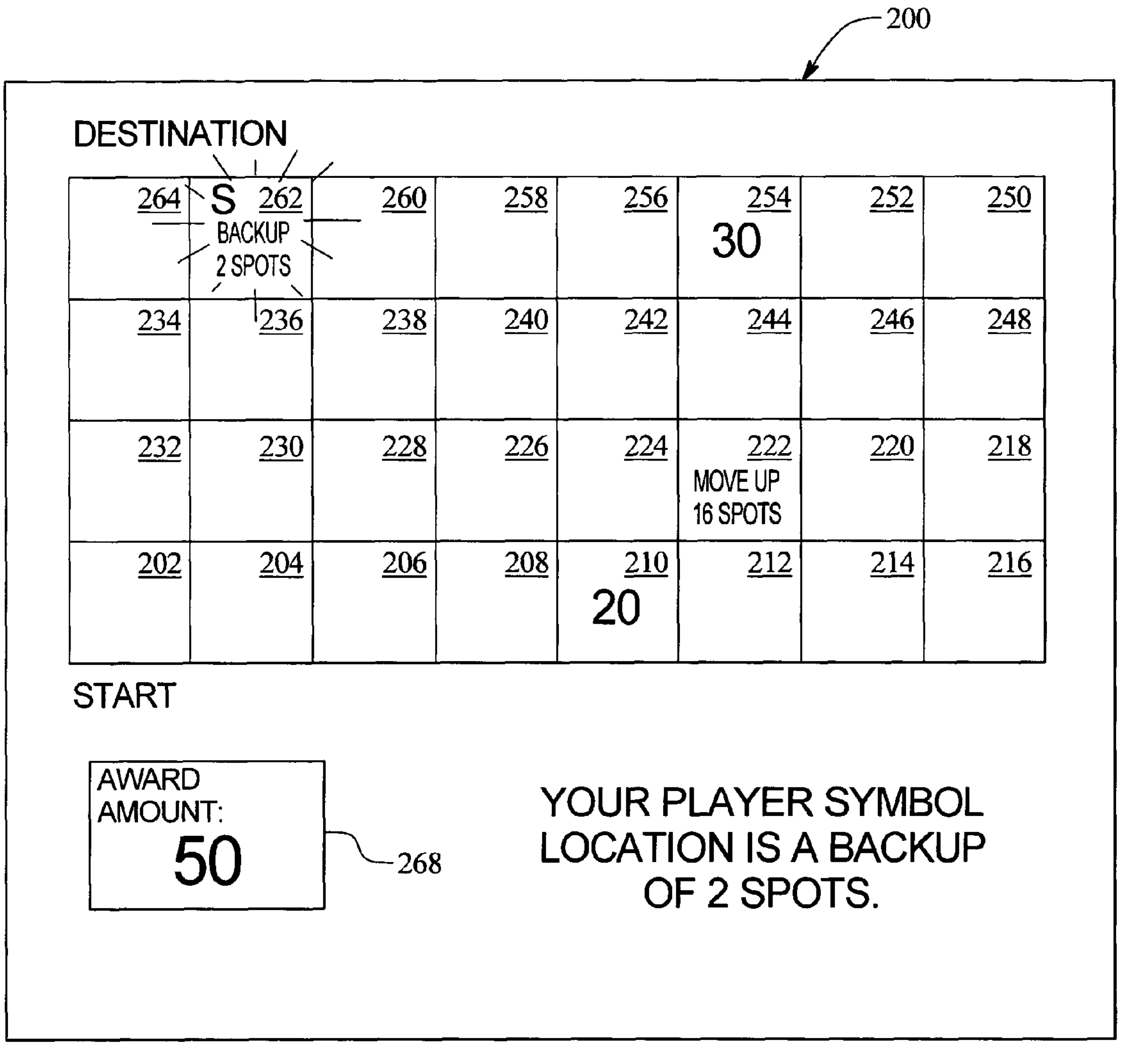

Since the player symbol has not reached the destination location, the gaming device moves the player symbol at least one location toward the destination location. As illustrated in FIG. 8E, the gaming device moves the player symbol four locations toward the destination location to highlighted location 262. Location 262 is revealed to be associated with a setback condition of moving the player symbol two locations away or further from the destination location. Appropriate messages such as "YOUR PLAYER SYMBOL LOCATION IS A BACKUP OF 2 SPOTS" are preferably provided to the player visually, or through suitable audio or audiovisual displays. It should be appreciated that at this point in the game, if the location 262 had not been associated with a setback condition, the player symbols next move would have moved the symbol to or beyond the destination location and thus ending the game. Therefore, in this embodiment, the setback condition aided the player by enabling the player symbol to make at least one more move and for the player to potentially obtain one more award. That is, unlike the embodiments described above wherein the setback conditions hinder the player symbol's progress toward the destination location and the advance conditions aid the player symbol's progress toward the destination location, in this embodiment, the setback conditions aid the player and the advance conditions hinder the player symbol's progress toward the destination location.

Figure 8F:
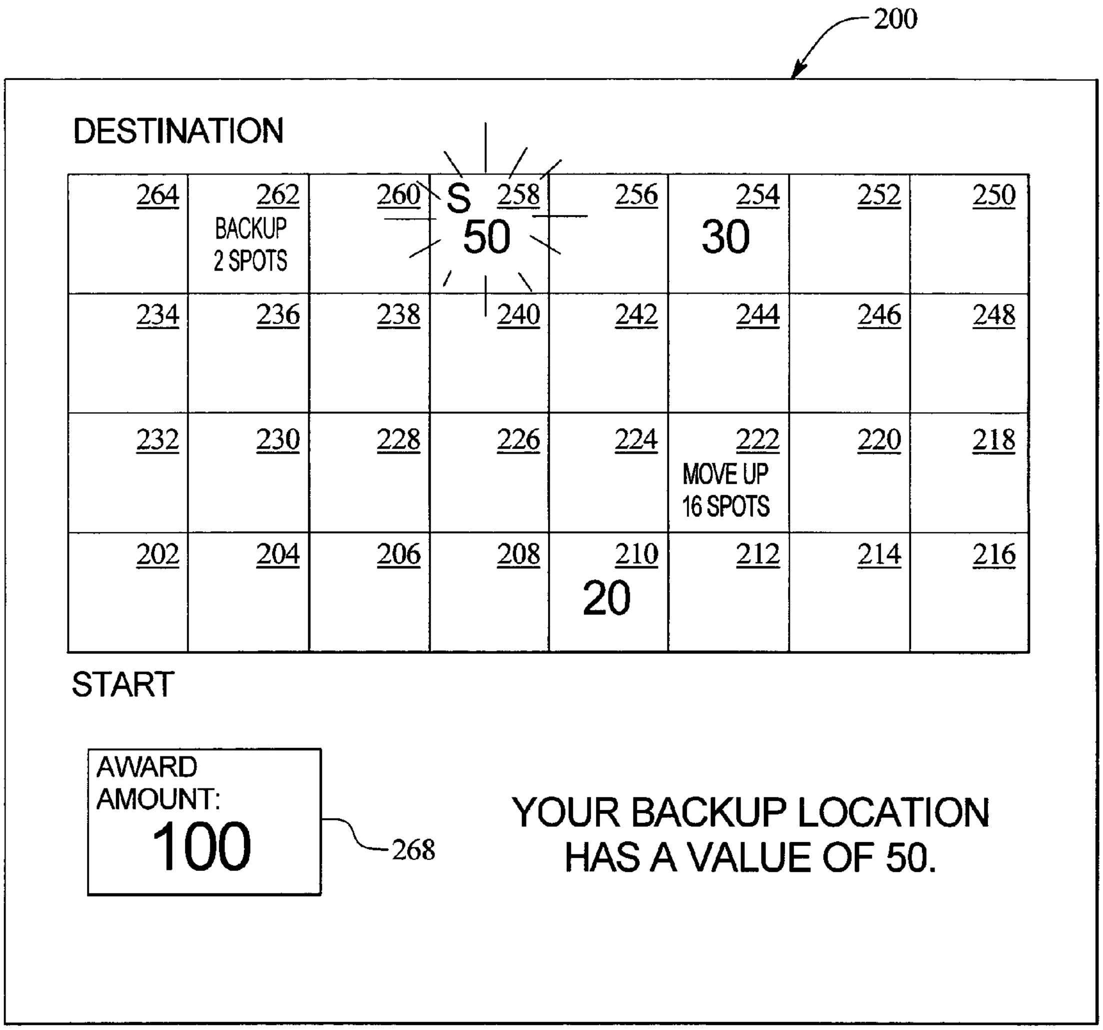

As illustrated in FIG. 8F, the player symbol is accordingly moved back to highlighted location 258 which is revealed to be associated with an award of fifty. In one embodiment, the closer the locations are to the destination location, the greater the risk that the next move will be to or beyond the destination location and thus the greater the award associated with the locations. The revealed award is provided to the player and the award display 268 is updated to reflect the current total provided award amount. Appropriate messages such as "YOUR BACKUP LOCATION HAS A VALUE OF 30" are preferably provided to the player visually, or through suitable audio or audiovisual displays.

Figure 8G:
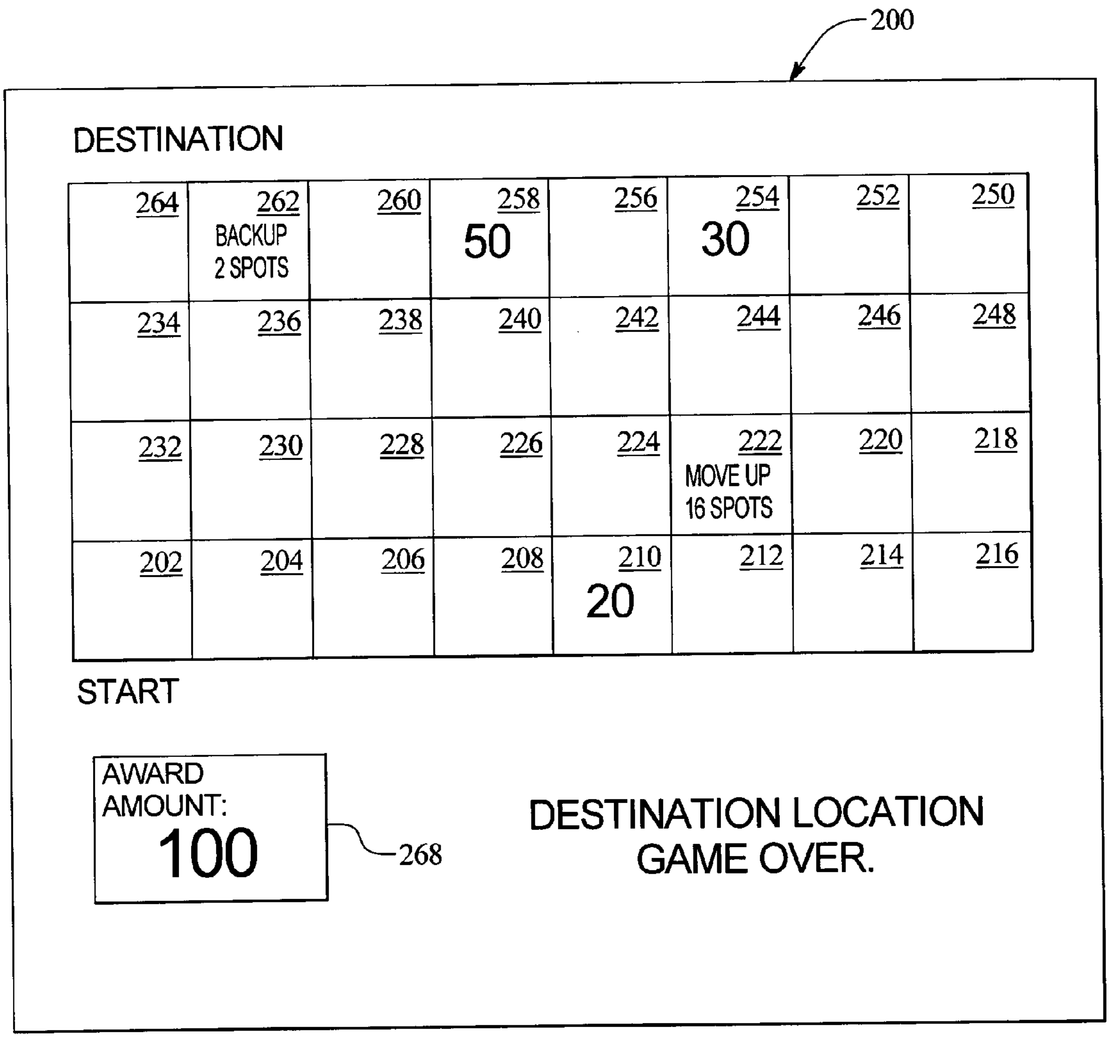

Since the player symbol has not reached the destination location, the gaming device moves the player symbol at least one location toward the destination location. As illustrated in FIG. 8G, the gaming device moves the player symbol three locations toward the destination location to the highlighted destination location 264. As the player symbol is now located at the destination location, the game ends and the player cannot be provided any more awards. In one embodiment, the game ends if the symbol is moved beyond the destination location. In another embodiment, the game ends if the symbol is moved to or beyond the destination location. Appropriate messages such as "DESTINATION LOCATION" and "GAME OVER" are preferably provided to the player visually, or through suitable audio or audiovisual displays.

In one embodiment, the player is not provided any award associated with each location the player symbol is moved to, but rather the player is provided an award based on the number or amount of locations the symbol is moved to before the game ends. In this embodiment, the greater the number of locations the player symbol is moved to during the play of the game, the greater the award provided to the player at the end of the game. For example, if the player symbol is moved to four locations before player symbol reaches the destination location, the player is provided an award of ten credits. On the other hand, if the player symbol is moved to eight locations before the player symbol reaches the destination location, the player is provided an award of fifty credits. In another embodiment, the player is provided an award for the amount of different locations the symbol is moved to before the game ends. In an alternative embodiment, the less locations the player's symbol moves to before reaching the destination location, the greater the award that will be provided to the player. In this embodiment, the player's objective is to reach the destination location with as little moves as possible because the less moves it takes to reach the destination location, the greater the award. In another embodiment, the award provided to the player is based on a combination of the number of locations the player symbol moves to before the player symbol reaches the destination location and the awards associated with any of the locations the player symbol is moved to.

In an alternative embodiment of the present invention (not shown), the player is not provided an award for the symbol reaching or moving beyond the destination location, but rather, the player is provided an award based on how many locations between two predetermined locations, such as the start location and the destination location, that the symbol is moved to before the symbol reaches or is moved beyond one of the two predetermined locations. In this embodiment, unlike the embodiments described above, if the symbol is relocated or moved back to or back beyond the start location (i.e., by a setback condition), the game ends. In one embodiment, the player is provided any award associated with each location the player symbol is moved to. In another embodiment, the award provided to the player is based on the number of locations the player symbol is moved to before the player symbol is moved to a location that is not between the two predetermined locations. In an alternative embodiment, the less locations the player's symbol moves to before reaching a location that is not between the two predetermined locations, the greater the award that will be provided to the player. In another embodiment, the award provided to the player is based on a combination of the number of locations the player symbol moves to before the player symbol is moved to a location that is not between the two predetermined locations and any award provided for any of the locations the player symbol is moved to.

In this embodiment, depending on the current location of the symbol, both the setback conditions and the advance conditions can each hinder or aid the player. For example, if the symbol is close to the start location, then a setback condition hinders the player because the setback condition may relocate the symbol back beyond the start location thus ending the game. On the other hand, if the symbol is close to the destination location, then a setback condition aids the player because without relocating the symbol further away from the destination location, the symbol may be moved to or beyond the destination location, thus ending the game.

The bonus scheme of the present invention involves a player who is pursuing a destination location. In pursuit of this location, the player may encounter setback conditions and advance conditions. Depending upon where the player moves a symbol, a setback condition may or may not occur. Furthermore, as the player advances from location to location, the gaming device preferably provides the player with the option of accepting a particular bonus value and ending the bonus round, or continuing the bonus round with the risk of ultimately receiving a lower bonus value. In addition, if the player reaches the destination location, the gaming device preferably awards the player with a relatively high bonus value.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A gaming device comprising:

at least one input device configured to receive an input of a wager;

a display device configured to operate to display:

(i) a plurality of locations including a first location and at least one setback condition location, wherein the plurality of said locations form a path, and (ii) at least one symbol adapted to make a plurality of moves to a plurality of the locations, a processor; and at least one memory device which stores a plurality of instructions executable by the processor to cause the processor to operate with said at least one input device and said display device, for each play of a game, to:

(a) cause the symbol to move to one of the locations along the path toward the first location, (b) for each occurrence of the symbol moving to the at least one setback condition location, randomly determine whether to relocate the symbol to one of the locations along the path further from the first location, (c) if the random determination is to relocate the symbol to one of the locations along the path further from the first location, move the symbol to one of the locations along the path further from the first location, (d) determine a number of each of the locations the symbol has moved to, (e) repeat steps (a) to (d) until the symbol moves to the first location, and (f) provide a player an award based on the determined number of locations the symbol has moved to before the symbol moves to the first location, said award being separate from any value which is associated with any of the locations prior to the symbol being moved to any of said locations.

2. The gaming device of claim 1, wherein the display device is configured to operate to display at least one advance condition associated with at least one of said locations along the path.

3. The gaming device of claim 2, wherein when executed by the processor, said plurality of instructions cause said processor to move the symbol to one of the locations along the path toward the first location if the symbol moves to the location associated with the advance condition.

4. The gaming device of claim 1, wherein the display device is configured to operate to display a plurality of setback condition locations.

5. A gaming device comprising:

an input device;

a processor; and a display device configured to display a play of a game operable upon a wager by a player, wherein after each occurrence of a triggering event associated with said play of the game:

(a) a plurality of locations including a first location and at least one setback condition location are displayed, the plurality of locations forming a path;

(b) a symbol is moved to one of the locations along the path toward the first location, (c) for each occurrence of the symbol moving to the at least one setback condition location, a random determination is performed to determine whether to relocate the symbol to one of the locations along the path further from the first location, (d) if the random determination is to relocate the symbol to one of the locations along the path further from the first location, the symbol is moved to one of the locations along the path further from the first location, (e) a number of each of the locations the symbol has moved to is determined, (f) steps (b) to (e) are repeated until the symbol is moved to the first location, and (g) the player is provided an award based on the determined number of locations the symbol has moved to before the symbol moves to the first location, said award being separate from any value which is associated with any of the locations prior to the symbol being moved to any of said locations.

6. The gaming device of claim 5, which includes at least one advance condition associated with at least one of the locations along the path.

7. The gaming device of claim 6, wherein the symbol is moved to one of the locations toward the first location if the symbol moves to the location associated with the advance condition.

8. The gaming device of claim 5, which includes a plurality of setback condition locations.

9. A gaming device comprising:

at least one input device configured to receive an input of a wager;

a display device configured to operate to display:

(i) a plurality of locations including at least: a first location and at least one location before said first location, a second location and at least one location after said second location, and a plurality of designated locations which form a path between said first location and said second location, at least one of the designated locations being a setback condition location, and (ii) a plurality of awards associated with a plurality of said designated locations along the path, a processor; and at least one memory device which stores a plurality of instructions executable by the processor to cause the processor to operate with said at least one input device and said display device, for each play of a game, to:

(a) prior to causing a symbol to move to any of the locations, display the symbol at the first location, (b) cause the symbol to move to one of the locations toward the second location, (c) for each occurrence of the symbol moving to the at least one setback condition location, randomly determine whether to relocate the symbol to one of the locations further from the second location, (d) if the random determination is to relocate the symbol to one of the locations further from the second location, move the symbol to one of the locations further from the second location, (e) determine a number of each of the locations the symbol has moved to, (f) if the symbol is moved to said at least one location before the first location, cause a terminating condition to occur, (g) if the symbol is moved to said at least one location after the second location, cause the terminating condition to occur, (h) repeat steps (b) to (g) until the terminating condition occurs, and (i) after the terminating condition occurs, provide a player a total award based on: (i) any award associated with any of the designated locations the symbol has moved to, and (ii) the determined number of designated locations the symbol has moved to before the terminating condition occurred.

10. The gaming device of claim 9, wherein when executed by the processor, said plurality of instructions cause the processor to provide the player at least one award based on the number of different locations the symbol is moved to.

11. The gaming device of claim 9, wherein the display device is configured to operate to display at least one advance condition associated with at least one of said designated locations along the path.

12. The gaming device of claim 11, wherein when executed by the processor, said plurality of instructions cause said processor to move the symbol to one of the locations further from the first location if the symbol moves to the designated location associated with the advance condition.

13. The gaming device of claim 9, wherein the display device is configured to operate to display a plurality of setback condition locations.

14. A gaming device comprising:

an input device;

a processor; and a display device configured to display a play of a primary game operable upon a wager by a player, wherein after each occurrence of a triggering event associated with the play of the primary game:

(a) a plurality of locations are displayed, the plurality of locations include at least: a first location and at least one location before said first location, a second location and at least one location after said second location, and a plurality of designated locations which form a path between said first location and said second location, at least one of said plurality of designated locations being a setback condition location and a plurality of awards are associated with a plurality of said designated locations, (b) prior to causing a symbol to move to any of the locations, the symbol is displayed at the first location, (c) the symbol is moved to one of the locations toward the second location, (d) for each occurrence of the symbol moving to the at least one setback condition location, a random determination is performed to determine whether to relocate the symbol to one of the locations further from the second location, (e) if the random determination is to relocate the symbol to one of the locations further from the second location, the symbol is moved to one of the locations further from the second location, (f) a number of each of the locations the symbol has moved to is determined, (g) if the symbol is moved to the at least one of the location before the first location, a terminating condition occurs, (h) if the symbol is moved to the at least one location after the second location, the terminating condition occurs, (i) steps (c) to (h) are repeated until the terminating condition occurs, and (j) after the terminating condition occurs, a player is provided a total award based on: (i) any award associated with any of the designated locations the symbol has moved to, and (ii) the determined number of designated locations the symbol has moved to before the terminating condition occurred.

15. The gaming device of claim 14, wherein at least one award is provided to the player, based on the number of different locations the symbol is moved to.

16. The gaming device of claim 14, which includes at least one advance condition associated with at least one designated location along the path.

17. The gaming device of claim 16, wherein the symbol is moved to one of the locations further from the first location if the symbol moves to the designated location associated with the advance condition.

18. The gaming device of claim 14, which includes a plurality of setback condition locations.

19. A gaming device comprising:

at least one input device configured to receive an input of a wager;

a display device configured to operate to display:

(i) a plurality of locations including a first location and at least one setback condition location, wherein the plurality of said locations form a path, (ii) a plurality of awards associated with a plurality of the locations along the path, and (iii) at least one symbol adapted to make a plurality of moves to a plurality of the locations along the path, a processor; and at least one memory device which stores a plurality of instructions executable by the processor to cause the processor to operate with said at least one input device and said display device, for each play of a game, to:

(a) cause the symbol to move to one of the locations along the path toward the first location, (b) for each occurrence of the symbol moving to the at least one setback condition location, randomly determine whether to relocate the symbol to one of the locations along the path further from the first location, (c) if the random determination is to relocate the symbol to one of the locations along the path further from the first location, move the symbol to one of the locations along the path further from the first location, (d) determine a number of each of the locations the symbol has moved to, (e) repeat steps (a) to (d) until the symbol moves to the first location, and (f) provide a player a total award based on: (i) any award associated with any of the locations the symbol has moved to, and (ii) the determined number of locations the symbol has moved to before the symbol moves to the first location.

20. The gaming device of claim 19, wherein the display device is configured to operate to display at least one advance condition associated with at least one of said locations along the path.

21. The gaming device of claim 20, wherein when executed by the processor, said plurality of instructions cause said processor to move the symbol to one of the locations along the path toward the first location if the symbol moves to the location associated with the advance condition.

22. The gaming device of claim 19, wherein the display device is configured to operate to display a plurality of setback condition locations.

23. A gaming device comprising:

an input device;

a processor; and a display device configured to display a play of a game operable upon a wager by a player, wherein after each occurrence of a triggering event associated with said play of said game:

(a) a plurality of locations including a first location and at least one setback condition location are displayed, the plurality of locations forming a path, a plurality of awards are associated with a plurality of the locations along the path, (b) a symbol is moved to one of the locations along the path toward the first location, (c) for each occurrence of the symbol moving to the at least one setback condition location, a random determination is performed to determine whether to relocate the symbol to one of the locations along the path further from the first location, (d) if the random determination is to relocate the symbol to one of the locations along the path further from the first location, the symbol is moved to one of the locations along the path further from the first location, (e) a number of each of the locations the symbol has moved to is determined, (f) steps (b) to (e) are repeated until the symbol is moved to the first location, and (g) the player is provided a total award based on: (i) any award associated with any of the locations the symbol has moved to, and (ii) the determined number of locations the symbol has moved to before the symbol moves to the first location.

24. The gaming device of claim 23, which includes at least one advance condition associated with at least one of the locations along the path.

25. The gaming device of claim 24, wherein the symbol is moved to one of the locations toward the first location if the symbol moves to the location associated with the advance condition.

26. The gaming device of claim 23, which includes a plurality of setback condition locations.

27. A gaming device comprising:

at least one input device configured to receive an input of a wager;

a display device configured to operate to display:

(i) a first location and at least one location before said first location, (ii) a second location and at least one location after said second location, and (iii) a plurality of locations which form a path between said first location and said second location, at least one of said plurality of locations being a setback condition location, a processor; and at least one memory device which stores a plurality of instructions executable by the processor to cause the processor to operate with said at least one input device and said display device, for each play of a game, to:

(a) prior to causing a symbol to move to any of the locations, display the symbol at the first location, (b) cause the symbol to move to one of the locations toward the second location, (c) for each occurrence of the symbol moving to the at least one setback condition location, randomly determine whether to relocate the symbol to one of the locations toward the first location and further from the second location, (d) if the random determination is to relocate the symbol to one of the locations toward the first location and further from the second location, move the symbol to one of the locations toward the first location and further from the second location, (e) determine a number of each of the locations the symbol has moved to, (f) repeat steps (b) to (e) until the symbol moves to said at least one location before said first location or said at least one location after said second location, and (g) provide a player an award based on the determined number of locations the symbol has moved to before the symbol moves to said at least one location before said first location or said at least one location after said second location, said award being separate from any value which is associated with any of the locations prior to the symbol being moved to any of said locations.

28. The gaming device of claim 27, wherein the display device is configured to operate to display at least one advance condition associated with at least one of said designated locations along the path.

29. The gaming device of claim 28, wherein when executed by the processor, said plurality of instructions cause said processor to move the symbol to one of the locations toward the second location and further from the first location if the symbol moves to the at least one location associated with the advance condition.

30. The gaming device of claim 27, wherein the display device is configured to operate to display a plurality of setback condition locations.

31. A gaming device comprising:

an input device;

a processor; and a display device configured to display a play of a primary game operable upon a wager by a player, wherein after each occurrence of a triggering event associated with said play of said primary game:

(a) a first location and at least one location before said first location, a second location and at least one location before after said second location, and a plurality of locations which form a path between said first location and said second location are each displayed, at least one of said plurality of locations being a setback condition location, (b) prior to causing a symbol to move to any of the locations, the symbol is displayed at the first location, (c) the symbol is moved to one of the locations toward the second location, (d) for each occurrence of the symbol moving to the at least one setback condition location, a random determination is performed to determine whether to relocate the symbol to one of the locations toward the first location and further from the second location, (e) if the random determination is to relocate the symbol to one of the locations toward the first location and further from the second location, the symbol is moved to one of the locations toward the first location and further from the second location, (f) a number of each of the locations the symbol has moved to is determined, and (g) steps (c) to (f) are repeated until the symbol is moved to said at least one location before said first location or said at least one location after said second location, and (h) the player is provided an award based on the determined number of locations the symbol has moved to before the symbol moves to said at least one location before said first location or said at least one location after said second location, said award being separate from any value which is associated with any of the locations prior to the symbol being moved to any of said locations.

32. The gaming device of claim 31, which includes at least one advance condition associated with at least one of the locations.

33. The gaming device of claim 32, wherein the symbol is to one of the locations toward the second location and further from the first location if the symbol moves to the at least one location associated with the advance condition.

34. The gaming device of claim 31, which includes a plurality of setback condition locations.

35. A gaming device comprising:

at least one input device configured to receive an input of a wager;

a display device configured to operate to display:

(i) a first location and at least one location before said first location, (ii) a second location and at least one location after said second location, (iii) a plurality of designated locations which form a path between said first location and said second location, at least one of said plurality of designated locations being a setback condition location, and (iv) a plurality of awards associated with a plurality of said designated locations along the path, a processor; and at least one memory device which stores a plurality of instructions executable by the processor to cause the processor to operate with said at least one input device and said display device, for each play of a game, to:

(a) prior to causing a symbol to move to any of the locations, display the symbol at the first location, (b) cause the symbol to move to one of the locations toward the second location, (c) provide a player any award associated with the location the symbol has moved to, (d) for each occurrence of the symbol moving to the at least one setback condition location, randomly determine whether to relocate the symbol to one of the locations further from the second location, (e) if the random determination is to relocate the symbol to one of the locations further from the second location, move the symbol to one of the locations further from the second location, (f) if the symbol is moved to said at least one location before the first location, cause a terminating condition to occur, (g) if the symbol is moved said at least one location after the second location, cause the terminating condition to occur, and (h) repeat (b) to (g) until the terminating condition occurs.

36. The gaming device of claim 35, wherein when executed by the processor, said plurality of instructions cause the processor to provide the player at least one award based on the number of locations the symbol is moved to.

37. The gaming device of claim 35, wherein when executed by the processor, said plurality of instructions cause the processor to provide the player at least one award based on the number of different locations the symbol is moved to.

38. The gaming device of claim 35, wherein the display device is configured to operate to display at least one advance condition associated with at least one of said designated locations along the path.

39. The gaming device of claim 38, wherein when executed by the processor, said plurality of instructions cause said processor to move the symbol to one of the locations further from the first location if the symbol moves to the at least one designated location associated with the advance condition.

40. The gaming device of claim 35, wherein the display device is configured to operate to display a plurality of setback condition locations.

41. A gaming device comprising:

an input device;

a processor; and a display device configured to operate to display a play of a primary game operable upon a wager by a player, wherein after each occurrence of a triggering event associated with said play of said primary game:

(a) a first location and at least one location before said first location, a second location and at least one location before after said second location, and a plurality of designated locations which form a path between said first location and said second location are each displayed, at least one of said designated locations being a setback condition location and a plurality of awards are associated with a plurality of said designated locations along the path, (b) prior to causing a symbol to move to any of the locations, the symbol is displayed at the first location, (c) the symbol is moved to one of the locations toward the second location, (d) the player is provided any award associated with the location of the symbol has moved to, (e) for each occurrence of the symbol moving to the at least one setback condition location, a random determination is performed to determine whether to relocate the symbol to one of the locations further from the second location, (f) if the random determination is to relocate the symbol to one of the locations further from the second location, the symbol is moved to one of the locations further from the second location, (g) if the symbol is moved to said at least one location before said first location, a terminating condition occurs, (h) if the symbol is moved to said at least one location after the second location, a terminating condition occurs, and (i) steps (c) to (h) are repeated until the terminating condition occurs.

42. The gaming device of claim 41, wherein at least one award is provided to the player based on the number of locations the symbol is moved to.

43. The gaming device of claim 41, wherein at least one award is provided to the player based on the number of different locations the symbol is moved to.

44. The gaming device of claim 41, which includes at least one advance condition associated with at least one designated location along the path.

45. The gaming device of claim 44, wherein the symbol is moved to one of the locations further from the first location if the symbol moves to the at least one designated location associated with the advance condition.

46. The gaming device of claim 41, which includes a plurality of setback condition locations.

47. A method of operating a gaming device including a plurality of instructions, for each play of a game, said method comprising:

(a) causing a display device to display a plurality of locations including a first location and at least one setback condition location, the plurality of locations forming a path;

(b) causing at least one processor to execute the plurality of instructions to cause a symbol to move along the path toward the first location;

(c) for each occurrence of the symbol moving to the at least one setback condition location, randomly determining whether to relocate said symbol to one of the locations along the path further from the first location;

(d) if the random determination is to relocate the symbol to one of the locations along the path further from the first location, causing the at least one processor to execute the plurality of instructions to cause the symbol to move to one of the locations along the path further from the first location;

(e) causing the at least one processor to execute the plurality of instructions to determine a number of each of the locations the symbol has moved to;

(f) causing the at least one processor to execute the plurality of instructions to repeating steps (b) to (e) until the symbol is moved to the first location; and (g) providing a player an award based on the determined number of locations the symbol has moved to before the symbol is moved to the first location, said award being separate from any value which is associated with any of the locations prior to the symbol being moved to any of said locations.

48. The method of claim 47, wherein when executed by the at least one processor, the plurality of instructions cause the at least one processor to cause the symbol to move to one of the locations toward the first location if an advance condition is associated with the location of the symbol.

49. The method of claim 47, which is operated through a data network.

50. The method of claim 49, wherein the data network includes an internet.

51. A method of operating a gaming device including a plurality of instructions, for each play of a game, said method comprising:

(a) causing a display device to display a plurality of locations including at least: a first location and at least one location before said first location, a second location and at least one location after said second location, and a plurality of designated locations which form a path between said first location and said second location, at least one of said designated locations being a setback condition location and a plurality of awards are associated with a plurality of said designated locations;

(b) prior to causing a symbol to move to any of the locations, causing said display device to display the symbol at the first location;

(c) causing at least one processor to execute the plurality of instructions to cause the symbol to move to one of the locations toward the second location;

(d) for each occurrence of the symbol moving to the at least one setback condition location, randomly determining whether to relocate said symbol to one of the locations further from the second location;

(e) if the random determination is to relocate the symbol to one of the locations further from the second location, causing the at least one processor to execute the plurality of instructions to cause the symbol to move to one of the locations further from the second location;

(f) causing the at least one processor to execute the plurality of instructions to determine a number of each of the locations the symbol has moved to;

(g) if the symbol is moved to said at least one location before the first location, causing a terminating condition to occur;

(h) if the symbol is moved to said at least one location after the second location, causing the terminating condition to occur;

(i) repeating steps (c) to (h) until the terminating condition occurs; and (j) after the terminating condition occurs, providing a player a total award based on: (i) any award associated with any of the designated locations the symbol has moved to, and (ii) the determined number of designated locations the symbol has moved to before the terminating condition occurred.

52. The method of claim 51, wherein when executed by the at least one processor, the plurality of instructions cause the at least one processor to cause the symbol to move to one of the locations further from the first location if an advance condition is associated with the location of the symbol.

53. The method of claim 51, which is operated through a data network.

54. The method of claim 53, wherein the data network includes an internet.

55. A method of operating a gaming device including a plurality of instructions, for each play of a game, said method comprising:

(a) causing a display device to display a plurality of locations including a first location and at least one setback condition location, said plurality of locations forming a path and a plurality of awards are associated with a plurality of said locations along the path;

(b) causing at least one processor to execute the plurality of instructions to cause a symbol to move along the path toward the first location;

(c) for each occurrence of the symbol moving to the at least one setback condition location, randomly determining whether to relocate said symbol to one of the locations along the path further from the first location;

(d) if said random determination is to relocate the symbol to one of said locations along the path further from the first location, causing the at least one processor to execute the plurality of instructions to cause the symbol to move to one of said locations along the path further from the first location;

(e) causing the at least one processor to execute the plurality of instructions to determine a number of each of the locations the symbol has moved to;

(f) causing the at least one processor to execute the plurality of instructions to repeat steps (b) to (e) until the symbol is moved to the first location; and (g) providing a player an award based on: (i) any award associated with any of the locations the symbol has moved to, and (ii) the determined number of locations the symbol has moved to before the symbol moves to the first location.

56. The method of claim 55, wherein when executed by the at least one processor, the plurality of instructions cause the at least one processor to cause the player symbol to move to one of the locations toward the first location if an advance condition is associated with the location of the symbol.

57. The method of claim 55, which is operated through a data network.

58. The method of claim 57, wherein the data network includes an internet.

59. A method of operating a gaming device including a plurality of instructions, for each play of a game, said method comprising:

(a) causing a display device to display a first location and at least one location before said first location, a second location and at least one location after said second location, a plurality of locations along a path between said first location and said second location, at least one of said plurality of locations being a setback condition location;

(b) prior to causing a symbol to move to any of the locations, causing said display device to display the symbol at the first location;

(c) causing at least one processor to execute the plurality of instructions to cause the symbol to move to one of the locations toward the second location;

(d) for each occurrence of the symbol moving to the at least one setback condition location, randomly determining whether to relocate said symbol to one of the locations toward the first location and further from the second location;

(e) if the random determination is to relocate said, symbol to one of the locations toward the first location and further from the second location, causing the at least one processor to execute the plurality of instructions to cause the symbol to move to one of the locations toward the first location and further from the second location;

(f) causing the at least one processor to execute the plurality of instructions to determine a number of each of the locations the symbol has moved to;

(g) repeating steps (c) to (f) until the symbol is moved to said at least one location before said first location or said at least one location after said second location; and (h) providing a player an award based on the determined number of locations the symbol has moved to before the symbol is moved to the at least one location before said first location or the at least one location after said second location, said award being separate from any award which is associated with any of the locations prior to the symbol being moved to any of said locations.

60. The method of claim 59, wherein when executed by the at least one processor, the plurality of instructions cause the at least one processor to cause the symbol to move to one of the locations toward the second location and further from the first location if an advance condition is associated with the location of the symbol.

61. The method of claim 59, which is operated through a data network.

62. The method of claim 61, wherein the data network includes an internet.

63. A method of operating a gaming device including a plurality of instructions, for each play of a game, said method comprising:

(a) causing a display device to display a first location and at least one location before said first location, a second location and at least one location after said second location, a plurality of designated locations along a path between said first location and said second location, wherein at least one of said plurality of designated locations being a setback condition location and a plurality of awards are associated with a plurality of said designated locations along the path;

(b) prior to causing a symbol to move to any of the locations, causing said display device to display the symbol at the first location;

(c) causing at least one processor to execute the plurality of instructions to cause the symbol to move to one of the locations toward the second location;

(d) providing a player any award associated with the location the symbol has moved to;

(e) for each occurrence of the symbol moving to the at least one setback condition location, randomly determining whether to relocate said symbol to one of the locations further from the second location;

(f) if the random determination is to relocate the symbol to one of the locations further from the second location, causing the at least one processor to execute the plurality of instructions to cause the symbol to move to one of the locations further from the second location;

(g) if the symbol moves to said at least one locations before the first location, cause a terminating condition to occur;

(h) if the symbol moves to said at least one locations after the second location, cause the terminating condition to occur; and (i) repeating steps (c) to (h) until the terminating condition occurs.

64. The method of claim 63, wherein when executed by the at least one processor, the plurality of instructions cause the at least one processor to relocate the symbol to one of the locations further from the first location if an advance condition is associated with the location of the symbol.

65. The method of claim 63, which is operated through a data network.

66. The method of claim 65, wherein the data network includes an internet.

* * * * *

UNITED STATES PATENT AND TRADEMARK OFFICE

CERTIFICATE OF CORRECTION

PATENT NO. : 7,749,068 B2
APPLICATION NO. : 10/660075
DATED : July 6, 2010
INVENTOR(S) : Cuddy et al.

It is certified that error appears in the above-identified patent and that said Letters Patent is hereby corrected as shown below:

In Claim 14, Column 17, Lines 51 to 52, replace “the at least one of the location” with --the at least one location--.

In Claim 31, Column 20, Lines 33 to 34, replace “location before after said second location” with --location after said second location--.

In Claim 33, Column 21, Lines 4 to 5, replace “the symbol is to one” with --the symbol is relocated to one--.

In Claim 41, Column 22, Line 25, replace “location of the symbol” with --location the symbol--.

In Claim 59, Column 25, Line 15, replace “said, symbol” with --said symbol--.

Signed and Sealed this

Fourteenth Day of September, 2010

David J. Kappos
*Director of the United States Patent and Trademark Office*